(12) United States Patent
Kawarai et al.

(10) Patent No.: US 7,058,751 B2
(45) Date of Patent: Jun. 6, 2006

(54) PACKET SWITCH

(75) Inventors: Kenichi Kawarai, Kawasaki (JP); Hiroshi Tomonaga, Kawasaki (JP); Naoki Matsuoka, Kawasaki (JP); Masakatsu Nagata, Kawasaki (JP); Tsuguo Kato, Kawasaki (JP); Tetsuaki Wakabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 275 days.

(21) Appl. No.: 09/942,980

(22) Filed: Aug. 30, 2001

(65) Prior Publication Data

US 2002/0099900 A1    Jul. 25, 2002

(30) Foreign Application Priority Data

Jan. 5, 2001    (JP)    ............................. 2001-000647

(51) Int. Cl.
*G06F 13/00*    (2006.01)
(52) U.S. Cl. .................. 710/317; 710/316; 710/28; 710/310; 710/412; 710/355
(58) Field of Classification Search ........ 710/316–317, 710/131, 28, 310; 370/217–218, 229, 392, 370/390, 412, 355
See application file for complete search history.

(56) References Cited

U.S. PATENT DOCUMENTS

| 6,118,792 A * | 9/2000 | Beshai ........................ 370/468 |
| 6,771,596 B1 * | 8/2004 | Angle et al. ................. 370/229 |
| 2002/0064156 A1 * | 5/2002 | Minkenberg ................. 370/392 |
| 2002/0110086 A1 * | 8/2002 | Reches ........................ 370/235 |

FOREIGN PATENT DOCUMENTS

JP          09168016        6/1997

* cited by examiner

*Primary Examiner*—Rehana Perveen
*Assistant Examiner*—Kim T. Huynh
(74) *Attorney, Agent, or Firm*—Katten Muchin Rosenman LLP

(57) ABSTRACT

The packet switch performs a scheduling process by selecting a unicast packet or a multicast packet to be output from each of N input buffers such that input lines and output lines cannot conflict each other for a unicast packet, and such that the input lines cannot conflict each other for the multicast packet.

10 Claims, 29 Drawing Sheets

FIG. 2

|   | 0 1 2 3 4 5 6 7 | 1 0 1 2 3 4 5 6 7 | 2 0 1 2 3 4 5 6 7 | 3 0 1 2 3 4 5 6 7 |
|---|---|---|---|---|
| 0 | Vers=4 | IHL | Type of Service | Total Length |
| 1 | Identification | | Flags | Flagment Offset |
| 2 | Time to Live | Protocol | Header Checksum | |
| 3 | Source Address | | | |
| 4 | Destination Address | | | |
| 5 | IP Options | | | |
| 6 .. max 1639 | Payload | | | |

PACKET SWITCH

BACKGROUND OF THE INVENTION

The present invention relates to a packet switch for allotting a packet input through an input line to an output line.

Recently, with the fast spread of Internet in the world, the amount of communications traffic of lines has remarkably increased, and a high and large capacity packet switch has been earnestly demanded. Normally, the configurations of buffers realizing packet switches can be roughly grouped into output buffers, shared buffers, cross point buffers, and input buffers. From a viewpoint of throughput, packet switches using output buffers and shared buffers have conventionally been used for general purpose. However, a line speed has become higher and higher with number lines increased, and a packet switch using an input buffer having a relatively low memory access speed has been re-evaluated. For example, a memory access speed of the packet switch using the output buffer is N+1 (N indicates the number of lines) times as fast as the line speed. The memory access speed of the packet switch using a shared buffer is 2N times as fast as the line speed. On the other hand, the memory access speed of the packet switch using the input buffer is 2 times as fast as the line speed, that is, lower than the speeds of the packet switches using the output buffers, the shared buffers, etc.

Although it is known that, in the packet switch using the input buffer, the throughput is normally reduced down to 58.6% by the HOL (Head of Line) blocking, it is also know that 100% throughput can be attained by logically separating the FIFO in the input buffer for each output buffer.

The packet switch using a cross point buffer has almost the same characteristic in memory access speed and throughput as the packet switch using the input buffer. However, since it requires a buffer for each cross point, N×N buffers are required when the number of input lines and output lines is N each, thereby resulting in large hardware.

FIG. 28 shows the configuration of a conventional packet switch using an input buffer. It shows the configuration for realizing a multicast function of copying a packet input through an input line to a plurality of output lines. The configuration has been suggested in 'KR. Ahuja, B. Prabhakar and N. Mckeown, "Multicast scheduling for input-queued switches", IEEE J. Selected Areas Com., May 1996.'

The packet switch shown in FIG. 28 is provided with an input buffer having a unicast (UC) queue and a multicast (MC) queue. A packet read from the MULTICAST queue is copied in a crossbar switch, and transmitted to a plurality of output lines.

FIG. 29 shows another configuration of the conventional packet switch having the input buffer. The configuration has been suggested by 'Naoki Matsuoka et al., "A Study on Multicast Structure for Input Queued Switches", The Institute of Electronics, Information, and Communication Engineers, B-6-65, 1999.'

The packet switch shown in FIG. 29 has the same configuration as the packet switch shown in FIG. 28 in that the input buffer has a unicast queue and a multicast queue, but is different a multicast packet is copied in each input buffer and output to each output line.

However, in the conventional packet switch shown in FIG. 28, a scheduler provided for each input buffer, or a scheduler shared among a plurality of input buffers has to control the conflict among the output lines to which a multicast packet has to be copied for all input buffers in one unit time. Therefore, the conflict control is complicated, and causes the problem of a heavy load of the process. As a result, the conventional packet switch is not appropriate as a high-speed and large-capacity packet switch for processing a large number of conflicting lines in a short unit time.

Furthermore, in the conventional packet switch shown in FIG. 29, a multicast packet is copied in each input buffer. Accordingly, there are a large number of packets actually transmitted and received. As a result, the input rate of the multicast packets is low, and it becomes difficult to quickly perform processes.

SUMMARY OF THE INVENTION

OBJECT OF THE INVENTION

The present invention has been achieved to solve the above mentioned problems, and aims at providing a packet switch capable of reducing the load of the processes without lowering the input rate of multicast packets.

SUMMARY OF THE INVENTION

According to the present invention, a packet switch includes N input buffer sections, a switch section, and a scheduler section. The N input buffer sections are provided for each of N input lines, and store unicast packets and multicast packets input through corresponding input lines. The switch section outputs a unicast packet to any of M output lines to which a unicast packet is to be transmitted when it is input from each of the N input buffer sections, and outputs a multicast packet to a plurality of M output lines to which a multicast packet is to be transmitted when it is input. The scheduler section selects a unicast packet or a multicast packet to be output from each of the N input buffers such that input lines and output lines cannot conflict each other for a unicast packet, and such that input lines cannot conflict each other for a multicast packet. When unicast packets and multicast packets are input in a mixed manner, the scheduler section performs a scheduling process such that input lines and output lines cannot conflict each other for a unicast packet, and such that input lines cannot conflict each other for a multicast packet. The scheduler section can considerably reduce the load of the scheduling process by excluding a plurality of destination output lines of multicast packets from the targets of the conflict control. Since multicast packets are not copied in the input buffer section, the amount of data does not increase between the input buffer section and the switch section, thereby avoiding the reduction of the input rate of multicast packets.

It is desirable that the above mentioned switch section includes a first storage section storing a unicast packet corresponding to each of the M output lines; a second storage section storing a multicast packet corresponding to each of the N input lines. Since there is no conflict among the output lines for a unicast packet, the capacity can be reduced by providing a storage section for each output line. Similarly, since there is no conflict among the input lines, the capacity can be reduced by providing a storage section for each input line.

It is desirable that priority control is performed by dividing for each quality of service the above mentioned input buffer sections and at least one of the first storage section and the second storage section of the switch section. By performing priority control for each quality of service, various communications services can be provided. In addition, since a storage section is divided in advance, individual control and packet storage can be perform for each quality of service, and a packet can be stored and read separately for each quality of service, thereby realizing a simple structure.

In addition, it is desirable that a unicast packet or a multicast packet can be stopped to enter the switch section from the input buffer section by issuing a congestion notification from the switch section to at least one of the input buffer section and the scheduler section when the above mentioned first storage section or second storage section enters a congestion state. By stopping inputting a packet in the congestion, the packet can be prevented from being discarded in the switch section.

Furthermore, as described above, it is desirable that a congestion notification about a storage section in the switch section can be issued and the input buffer section can stop outputting a packet for each quality of service when the input buffer sections and at least one of the first storage section and the second storage section of the switch section are divided for each quality of service.

It is further desired that the above mentioned scheduler section can reserve the timing at which a packet other than multicast packets cannot be transmitted through a plurality of destination output lines of multicast packets when a multicast packet is inputted from a input buffer section to a switch section. Thus, the possibility that any of the storage sections can overflow by conflict in the switch section between multicast packets and unicast packets can be reduces. Furthermore, since control is performed only by excluding a plurality of output lines from the targets to be selected, the control is not complicated, thereby performing the process at a high speed.

Additionally, it is desirable that a plurality of switch sections are provided, one switch section receives a part of a divided unicast packet or multicast packet input through an input line and divided into plural sections, and a plurality of switch sections concurrently transfer plural pieces of divided data corresponding a packet. Since packets can be concurrently transferred by a plurality of switch sections, they can be quickly transferred using low-speed switch sections.

Furthermore, it is desirable that a plurality of switch sections are provided, one switch section receives a unicast packet or a multicast packet input through an input line in plural unit times, and a plurality of switch sections concurrently transfer different packets. By transferring a packet using a switch section, any of other switch sections can normally transfer the packet even when a switch section becomes faulty.

In case where the above mentioned plural packets forms a frame, it is also desirable that each of the plural packets is assigned a first sequence number for identification of the order of the frame, a second sequence number for identification of the order of the packet in the frame, and a frame assembly section is further included to rearrange the packets in the frame based on the second sequence numbers in the output line side, and rearrange frames based on the first sequence numbers. Even if a plurality of switch sections are used to transfer a plurality of packets, and the transfer orders can be inverted, the correct frame order and packet order can be maintained, thereby generating a normal frame in the output line side.

In case where the plurality of packets form a frame, it is further desirable that each of the above mentioned plural packets is assigned a first sequence number for identification of the order of the frame, a second sequence number for identification of the order of the packet in the frame, and a corresponding switch section is instructed to stop transferring packets when the number of frames being rearranged reaches a predetermined value when packets are rearranged based on the first and second sequence numbers in the output line side. Since the number of frames to form a frame (rearrange packets) can be equal to or smaller than a predetermined value, the process of forming a frame can be easily managed.

It is desirable that an IP packet having a variable length is formed by the above mentioned plural packets, and a packet belonging to the same flow is input to the same switch based on the flow identifier of an IP packet in the input line side. Since the order of the packets can be prevented at the flow level from being inverted, it is not necessary to store a number of received packets in the frame assembly section side, thereby minimizing the requirements for the capacity of a buffer, etc.

BRIEF DESCRIPTION OF THE DRAWINGS

FIG. 2 shows a format of an example of a variable length frame;

DESCRIPTION OF THE PREFERRED EMBODIMENT

Described below in detail will be a packet switch according to an embodiment of the present invention.

First Embodiment

Figure 1:
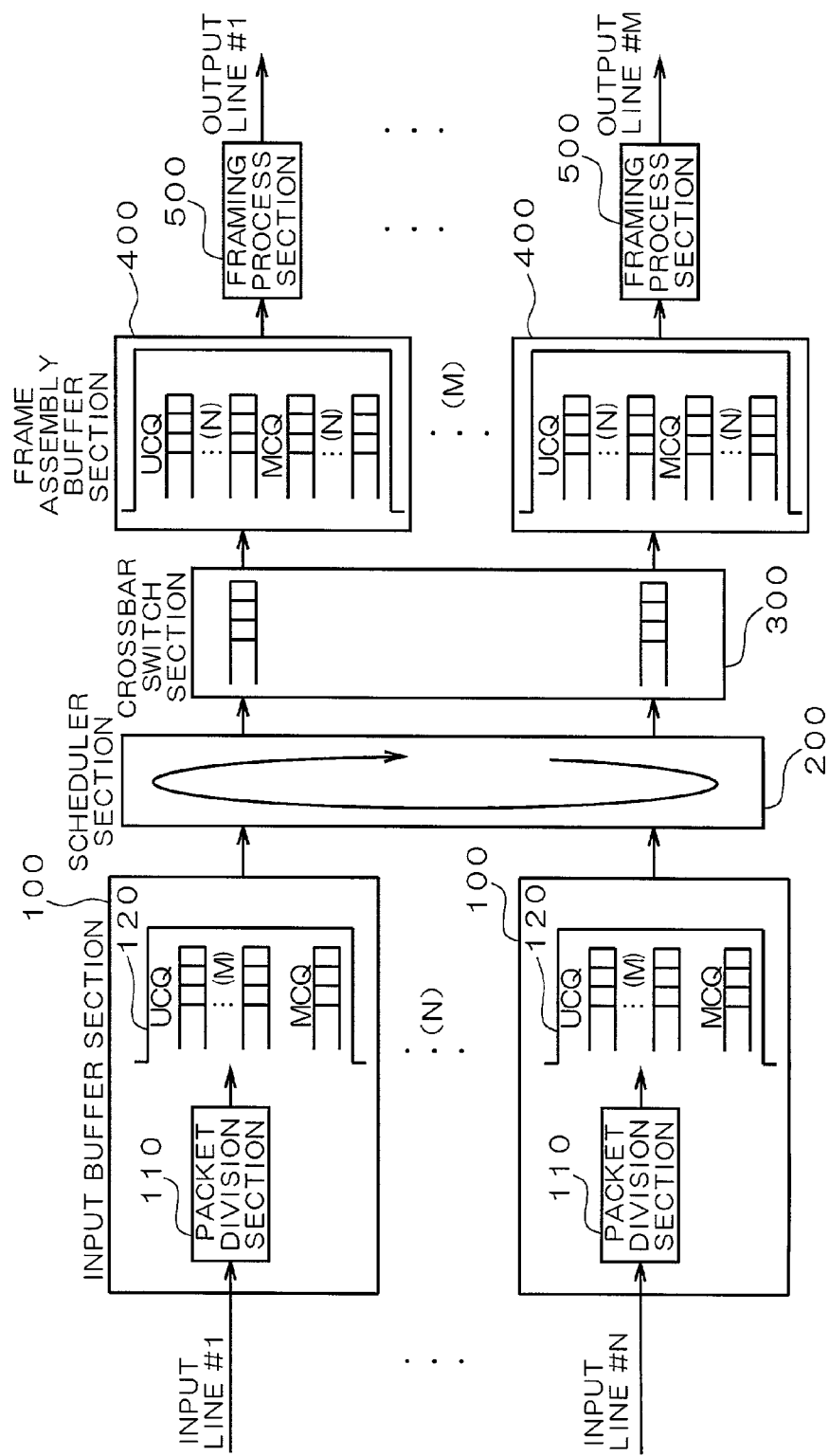
FIG. 1 shows a configuration of a packet switch according to a first embodiment of the present invention.

FIG. 1 shows a configuration of the packet switch according to a first embodiment of the present invention. As shown in FIG. 1, the packet switch according to the present embodiment comprises N input buffer sections 100, a scheduler section 200, a crossbar switch section 300, M frame assembly buffer sections 400, and M framing process sections 500.

The N input buffer sections 100 are provided respectively corresponding to N input lines #1 through #N, divide a variable length frame input through a corresponding input line into fixed length packets, and store them. Each input buffer section 100 comprises a packet division section 110 and a packet buffer 120. The packet division section 110 divides a variable length frame input through a corresponding input line into one or more fixed length packets.

FIG. 2 shows the format of an example of a variable length frame, and shows the packet format of an IPv4 format (Internet Society RFC791). As shown in FIG. 2, the IP packet is configured by a version (Vers), a header length (IHL), a type of service (Type of Service), a total length of a payload (Total Length), an identification (Identification), a flag (Flags), a fragment offset (Fragment Offset), a time to live (Time to Live), a protocol (Protocol), a header checksum (Header Checksum), a source address (Source Address), a destination address (Destination Address), an IP option (IP Option), and a payload (Payload). Since the IP header and the payload have variable lengths, the entire packet (frame) has a variable length.

Figure 3:
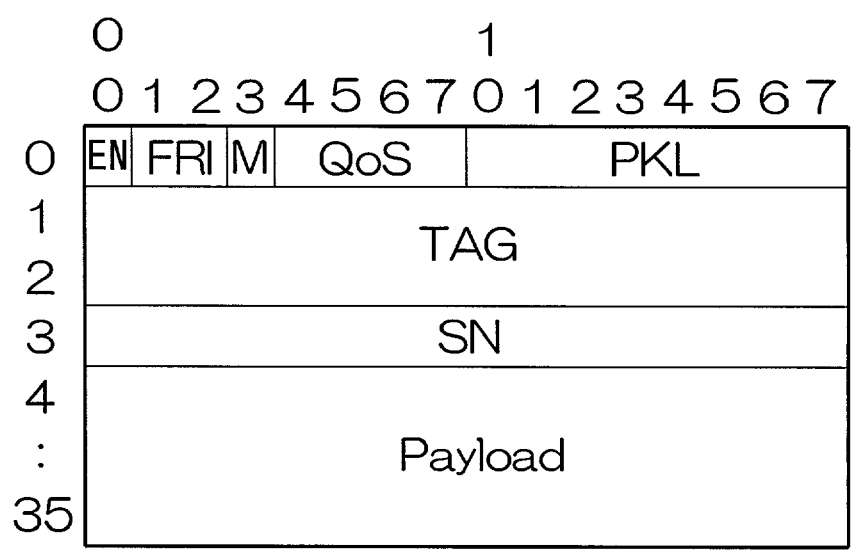
FIG. 3 shows a practical example of a fixed length packet generated by a packet division section.

FIG. 3 shows a practical example of a fixed length packet of the embodiment formed by dividing the packet division section 110. As shown in FIG. 3, the fixed length packet used in the present embodiment is configured by an empty cell identification (EN), a frame type (FRI), a multicast identification (M), a quality of service (QoS), a total length (PKL), a TAG identification (TAG), a sequence number (SN), and a payload. An empty cell identification is used for identifying as to whether each fixed length packet is an empty cell (EN bit is set to 0) or a valid cell (EN bit is set to 1) when each fixed length packet is set for a corresponding time slot. A frame type indicates the corresponding portion of the fixed length packet in a variable length frame. The type is set to "00" when the packet is in the middle of the frame, "01" when it is at the head of the frame, "10" when it is at the end of the frame, and "11" when it is at the head and end of the frame. A multicast identification is used for identifying as to whether the fixed length packet is a multicast packet or a unicast packet. When it is a multicast packet, "1" is stored. A quality of service is used when different priority levels are assigned among fixed length packets. For example, information whether a fixed length packet is assigned a high priority level for a reserved band, etc. A TAG identification stores information specifying a destination output line of the fixed length packet. For example, one output line is specified for a unicast packet, and a plurality of output lines are specified for a multicast packet. Sequence numbers are serial numbers sequentially assigned from the head of a variable length frame to a plurality of fixed length packets obtained by dividing the variable length frame.

The packet buffer 120 shown in FIG. 1 has (M+1) queues to store unicast packets and multicast packets through corresponding input lines. Among the queues, M queues are logic queues VOQ (Virtual Output Queue)#1 through #M respectively corresponding to M output lines #1 through #M, and store unicast packets for which respective output lines are specified as destinations. The remaining queue is a logic queue VOQ for multicast packets, and sequentially stores multicast packets input through corresponding input lines in the order of input. The logic queues VOQ #1 through #N for unicast packets are hereinafter referred to as unicast queues UCQ #1 through #N, and the logic queues VOQ for multicast packets is hereinafter referred to as a multicast queue MCQ.

The scheduler section 200 controls the conflict among unicast packets and multicast packets stored in each input buffer section 100 based on a scheduling request from each input buffer section 100. Practically, the scheduler section 200 performs a scheduling process on each of the N input buffer sections 100 for determining a unicast packet or a multicast packet such that input lines and output lines cannot conflict each other for a unicast packet, and input lines cannot conflict each other for a multicast packet.

The crossbar switch section 300 switches paths in a fixed length packet unit according to the destination information (the TAG identification in the format shown in FIG. 3) about the unicast packets or the multicast packets (fixed length packets) read from each input buffer section 100 based on the scheduling process result. Furthermore, when a multicast packet is input from one of the input buffer sections 100, the crossbar switch section 300 copies the multicast packet for each of the output lines specified as the destinations of the multicast packet, and outputs them to the respective output lines. In addition, the crossbar switch section 300 has a queue (buffer) for storing a packet in conflict for each input or output line.

M frame assembly buffer sections 400 are provided for the respective M output lines #1 through #M, and have N unicast queues UCQ and N multicast queues MCQ. The N unicast queues UCQ respectively correspond to the N input lines #1 through #N. The unicast packets input through any input line are stored in each unicast queues corresponding to the input lines respectively. Similarly, the N multicast queues MCQ respectively correspond to the N input lines #1 through #N, and store the multicast packets output to the corresponding output lines in the respective input lines. The unicast packet or the multicast packet corresponding to each input line is output as interleaved to each output line from the crossbar switch section 300. The frame assembly buffer section 400 performs the process of classifying the packets by input lines and packet types (unicast/multicast) for assembly. A plurality of fixed length packets forming each variable length frame are sequentially transmitted in a frame unit in the order of reception to the framing process section 500 at the next stage. The framing process section 500 generates an original variable length frame with the header portion of each fixed length packet removed.

Figure 4:
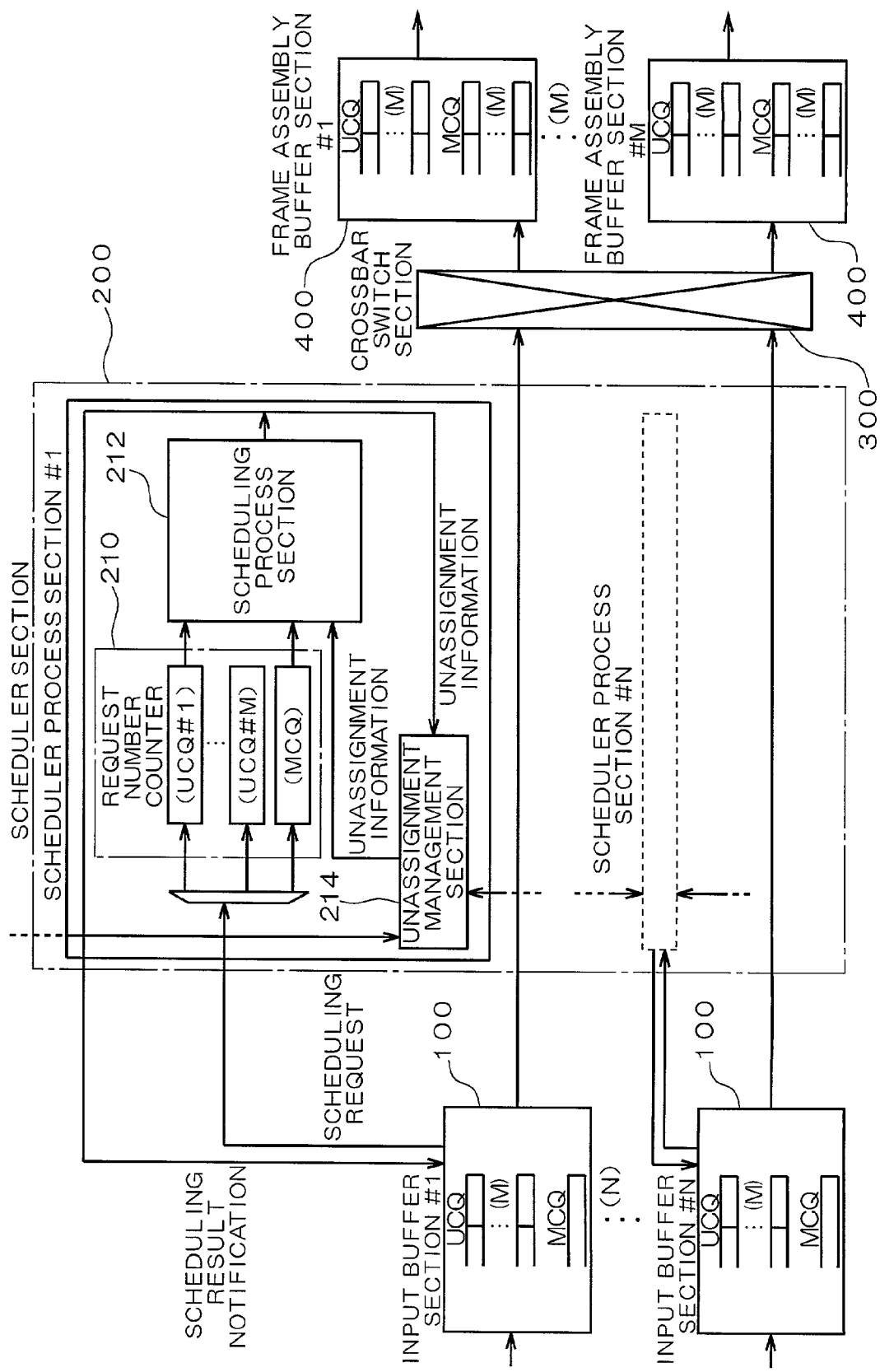
FIG. 4 shows a detailed configuration of a scheduler section.

FIG. 4 shows a detailed configuration of the scheduler section 200. As shown in FIG. 4, the scheduler section 200 has N scheduler process sections #1 through #N respectively corresponding to the N input lines #1 through #N. Each scheduler process section has the same configuration, and the configuration and the operation of the scheduler process section #1 are representatively described below.

The scheduler process section #1 comprises a request number counter 210 for counting the number of scheduling requests corresponding to the M unicast queues UCQ and one multicast queue MCQ stored in the packet buffer 120 in the input buffer section #1 (the input buffer sections 100 respectively corresponding to the input lines #1 through #N are referred to as input buffer sections #1 through #N); a scheduling process section 212 for determining a packet to be read next by selecting one of a plurality of scheduling requests based on a predetermined scheduling algorithm; and an unassignment management section 214 for managing an output line unassigned as the destination of a unicast packet.

When a unicast queue UCQ or a multicast queue MCQ in any of the packet buffers 120 in the input buffer section #1 stores a fixed length packet, a scheduling request notification corresponding to each storing operation is given to the scheduler process section #1. The notification contains the information specifying an input line and an output line, and the request number counter 210 in the scheduler section 200 counts the number of scheduling requests for each output line for unicast packets and collectively for multicast packets. The scheduling process section 212 performs a scheduling process using a round-robin pointer, for example, according to unassignment information (information specifying an unassigned output line) provided by the unassignment management section 214, and determines a packet to be read next. The determined contents are transmitted to the input buffer section #1 as a scheduling result notification. The scheduling result contains a multicast identification for specification of the type of packet and an output line number for a unicast packet. The scheduling result is transmitted to the unassignment management section 214, and is used in the scheduling process in other scheduler process sections #2 through #N.

In the above mentioned description, the scheduler process section #1 is explained. However, the explanation holds true with other scheduler process sections #2 through #N, and the scheduling process is performed in each of the N scheduler process sections #1 through #N, and a packet to be read every packet hour (1 unit time) corresponding to the packet transmission interval in each input buffer section 100 can be determined.

The packet switch according to the present embodiment has the above mentioned configuration, and the operation of the packet switch will be described below.

Figure 5:
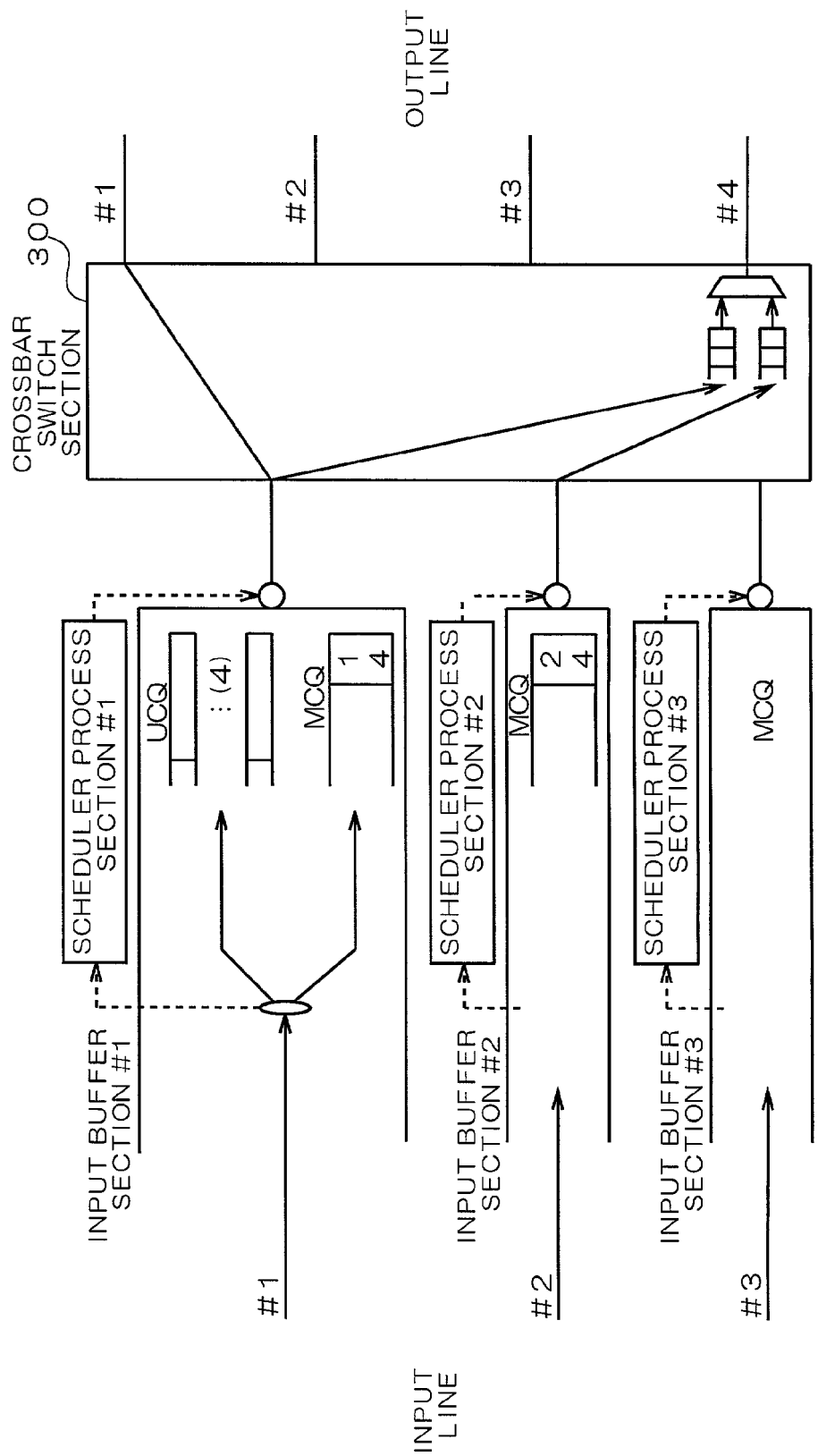
FIG. 5 shows an outline of an operation of the packet switch according to an embodiment of the present invention.

FIG. 5 shows an outline of an operation of the packet switch according to the present embodiment. For example, it is assumed that the crossbar switch section 300 accommodates three input lines #1 through #3 and four output lines #1 through #4.

The input buffer section #1 has four unicast queues UCQ respectively corresponding to the four output lines #1 through #4, and a multicast queue MCQ for a multicast packet, and stores fixed length packets output from the packet division section 110 by packet types and output lines. Parallel to the storing operation, a scheduling request notification is transmitted from the input buffer section #1 to the scheduler process section #1. The scheduler process section #1 selects a packet to be output next based on a plurality of scheduling requests being issued at that time, and the contents of the selection are returned to the input buffer section #1 as a scheduling result. The input buffer section #1 reads a packet from either four unicast queues UCQ or a multicast queue MCQ based on the received scheduling result, and transfers the packet to the crossbar switch section 300. The process is performed in each of the input buffer sections and each of the scheduler process sections.

On the other hand, the crossbar switch section 300 switches the destination of the packet according to the destination information (TAG identification) assigned to each packet. A multicast packet is copied for each of the destination output lines. At this time, when a plurality of packets are generated for the same destination output line, only one of the packets is transmitted to this output line, and the other packets are stored in the queue provided in the crossbar switch section 300 for each output line or input line, and the transmission timing is changed into the next or subsequent timings.

Figure 6:
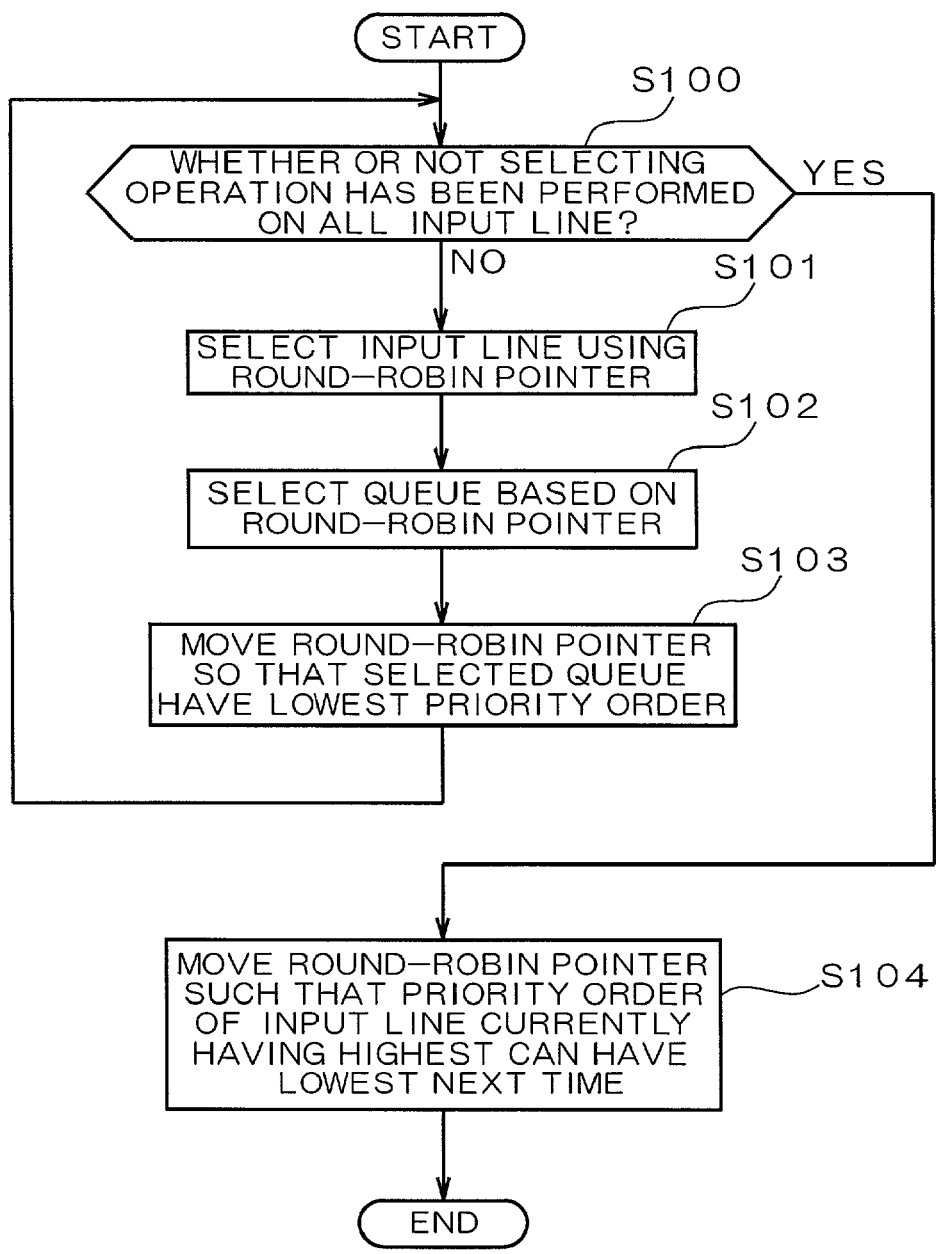
FIG. 6 is a flowchart showing a practical example of a scheduling process by a scheduler section.

FIG. 6 is a flowchart of a practical example of a scheduling process in the scheduler section 200, and shows the procedure of the operation performed using around-robin pointer. FIGS. 7A through 7D show practical scheduling processes performed using a round-robin pointer. In each of FIGS. 7A through 7D, a large circle indicates that a packet is stored in the unicast queue UCQ and the multicast queue MCQ corresponding to each input line, and a scheduling request notification is issued. A black painted circle indicates that a scheduling process has been selected. A small circle indicates a round-robin pointer which is contained for selection of an input line to be processed, and is contained for selection of a queue from which a packet is read in each input line.

The scheduler process sections #1 through #N determine whether or not the operation of selecting a queue to be read has been performed on all input lines (step S100). When an input line for which no queue has been selected exists, a negative determination is output, and the scheduler process section corresponding to the input line starts its operation.

First, each of the scheduler process sections #1 through #N selects an input line on which a scheduling process is performed using a round-robin pointer (step S101). In an example shown in FIG. 7A, since a round-robin pointer for selection of an input line is located in the position of the input line #1, the input line #1 is first selected as a process target.

Figure 7A:
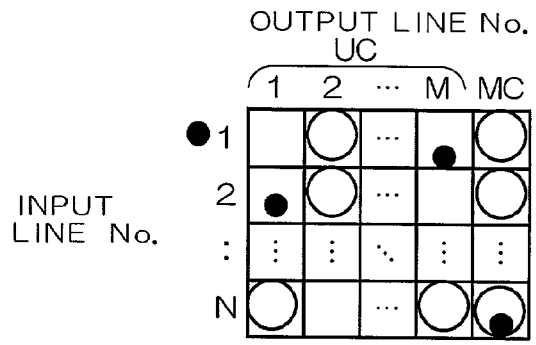
FIGS. 7A through 7D show practical scheduling processes performed using a round-robin pointer.
Figure 7B:
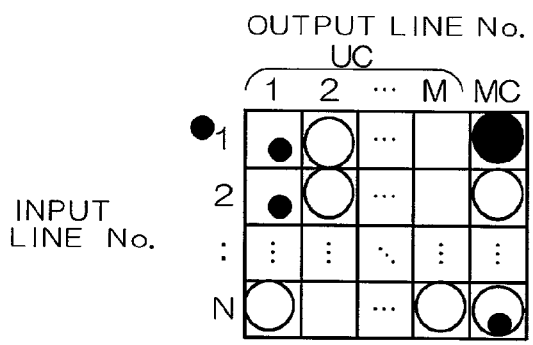
Figure 7C:
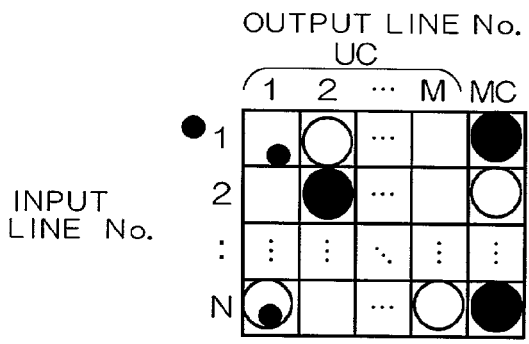

Then, the scheduler process section #1 corresponding to the selected input line #1 selects a queue to be read from M unicast queues UCQ or a multicast queue MCQ based on the round-robin pointer (step S102). In the example shown in FIG. 7A, although a round-robin pointer is located in the position corresponding to the M-th unicast queue UCQ, there is no scheduling request corresponding to the M-th unicast queue UCQ. Therefore, the scheduling request is traced in a predetermined order, and a queue in which the scheduling request is first contained (for example, a multicast queue MCQ) is selected. Thus, if a multicast queue MCQ is selected, the scheduler process section #1 moves the round-robin pointer in the position of the first unicast queue UCQ so that the selected multicast queue MCQ can have the lowest priority order as shown in FIG. 7B (step S103). A unicast queue UCQ is selected from those for which output lines are unassigned by referring to the unassignment information transmitted and received between scheduler process sections.

When the scheduling process is completed corresponding to the input line #1, control is returned to step S100, and a scheduling process is performed on other input lines for which no queue to be read is selected. Thus, a queue from which a packet is to be read is selected for each of the N input lines #1 through #N. For example, in an example shown in FIG. 7C, a multicast queue MCQ is selected corresponding to the input line #1, the unicast queue UCQ #2 is selected corresponding to the input line #2, . . . , and a multicast queue MCQ is selected corresponding to the input line #N.

Figure 7D:
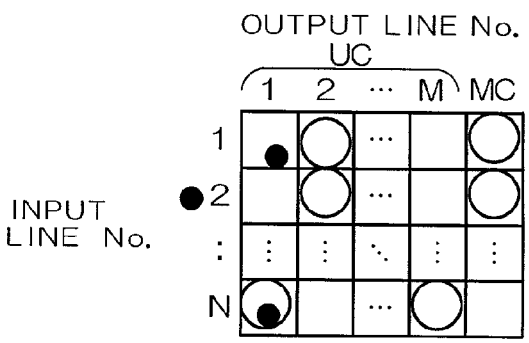

When the selecting process is completed on all input lines, affirmative determination is made in step S100, and then each of the scheduler process sections #1 through #N moves the position of the round-robin pointer such that the priority order of the input line currently having the highest order can have the lowest order next time (step S104). In examples shown in FIGS. 7A through 7C, since the highest priority level is currently assigned to the input line #1, the position of the round-robin pointer is set so that the priority level of the next input line #2 can be the highest and the priority level of the input line #1 can be the lowest as shown in FIG. 7D.

In the practical example of the above mentioned scheduling process, a round-robin pointer is used. However, other scheduling algorithms can also be used.

Described below will be a configuration of a buffer in the crossbar switch section 300.

Figure 8:
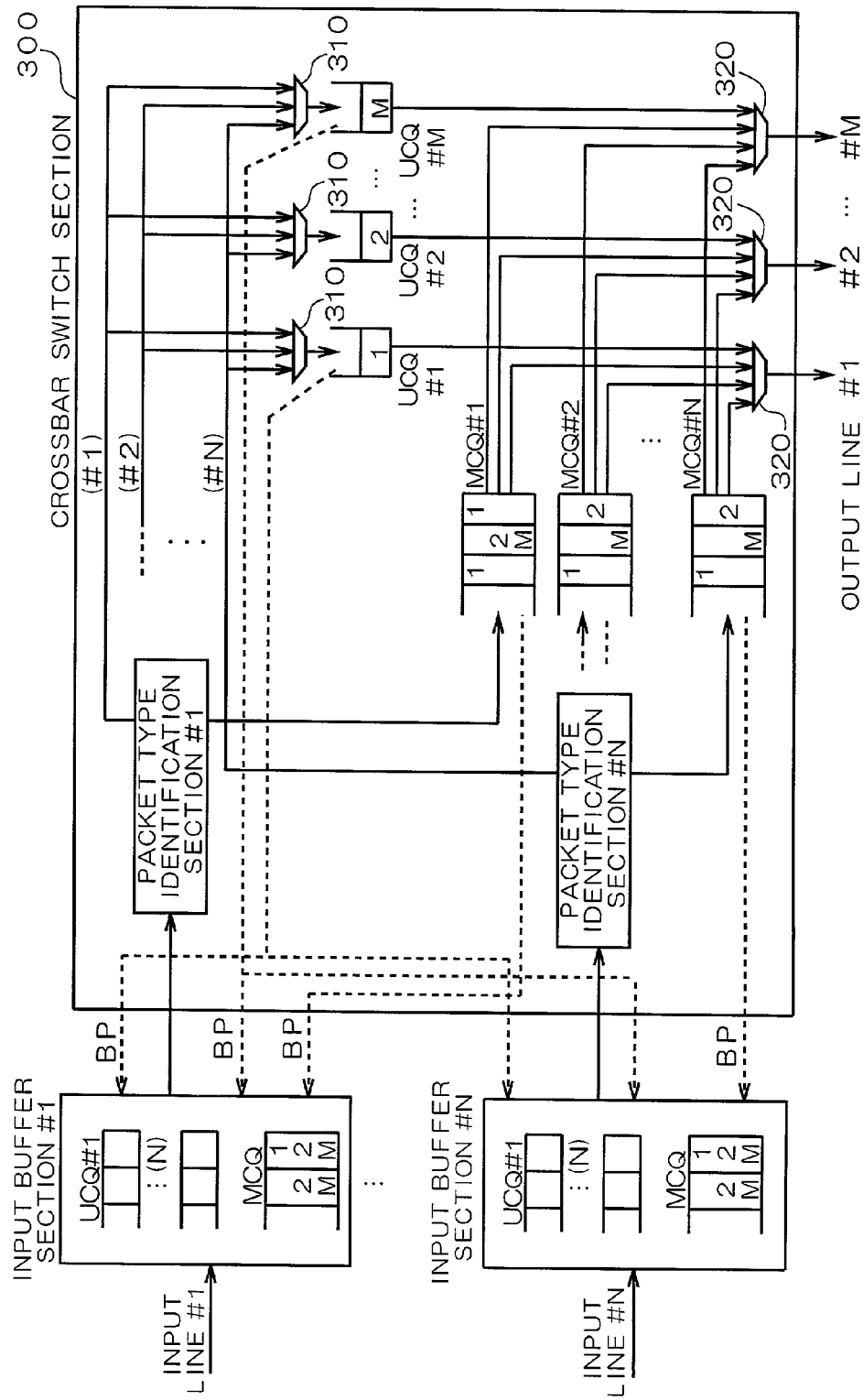
FIG. 8 shows a detailed configuration of a crossbar switch section according to an embodiment of the present invention.

FIG. 8 shows a detailed configuration of the crossbar switch section 300 according to the present embodiment. A buffer storing unicast packet is provided for each output line, and a buffer storing multicast packet is provided for each input line.

The crossbar switch section 300 shown in FIG. 8 comprises M unicast queues UCQ #1 through #M provided respectively corresponding to the output lines #1 through #M, N multicast queues MCQ #1 through #N respectively corresponding to input lines #1 through #N, M selectors 310 provided before the M unicast queues UCQ #1 through #M and M selectors 320 provided after the M unicast queues UCQ #1 through #M, and N packet type identification sections #1 through #N for identification of the type of packet input from the input lines #1 through #N, and for allotment of the packet to the unicast queue UCQ or the multicast queue MCQ.

The type of packet input from each of the input buffer sections #1 through #N to the crossbar switch section 300 is identified (unicast or multicast) in each of the packet type identification sections #1 through #N respectively provided for the input lines. As a result of the identification, a unicast packet is transmitted to a unicast queue UCQ corresponding to a destination input line of the packet through the selector 310, and is then stored in order of input. The packets stored in the unicast queues UCQ #1 through #M are sequentially read from the first packet, and are then input into the selector 320 at the subsequent stage. As a result of the identification, a multicast packet is transmitted to the multicast queue MCQ one to one corresponding to each of the input lines #1 through #N, and is then stored in order of input. The packets stored in the multicast queues MCQ #1 through #N are sequentially read from the first packet, copied for each of the destinations, and input into the selector 320 one to one corresponding to each destination.

Each of the M selectors 320 stores packets output from the one-to-one corresponding unicast queue UCQ and the N multicast queues MCQ #1 through #N, selects one of the packets, and outputs it to a one-to-one corresponding output line.

Thus, the crossbar switch section 300 contains unicast queues UCQ and multicast queues MCQ, and sequentially outputs packets selected at a predetermined order when packets having the same destination output line conflict each other.

The volume of stored packets stored in the unicast queue UCQ and the multicast queue MCQ is managed by a queue management section not shown in the attached drawings. When packets exceeding the capacity are input and enter a congestion state, the queue management section transmits a back pressure instruction BP as congestion information to the input buffer sections #1 through #N which are the input sources of the packets. Upon receipt of the instruction, the input buffer sections #1 through #N stop transmitting packets to the unicast queue UCQ or the multicast queue MCQ which is the source of the instruction. The back pressure instruction BP can be transmitted to the corresponding scheduler process sections #1 through #N instead of the input buffer sections #1 through #N. Upon receipt of the instruction, the scheduler process sections #1 through #N perform the scheduling process to stop transmitting packets to the unicast queue UCQ or the multicast queue MCQ which is the source of the instruction.

Figure 9:
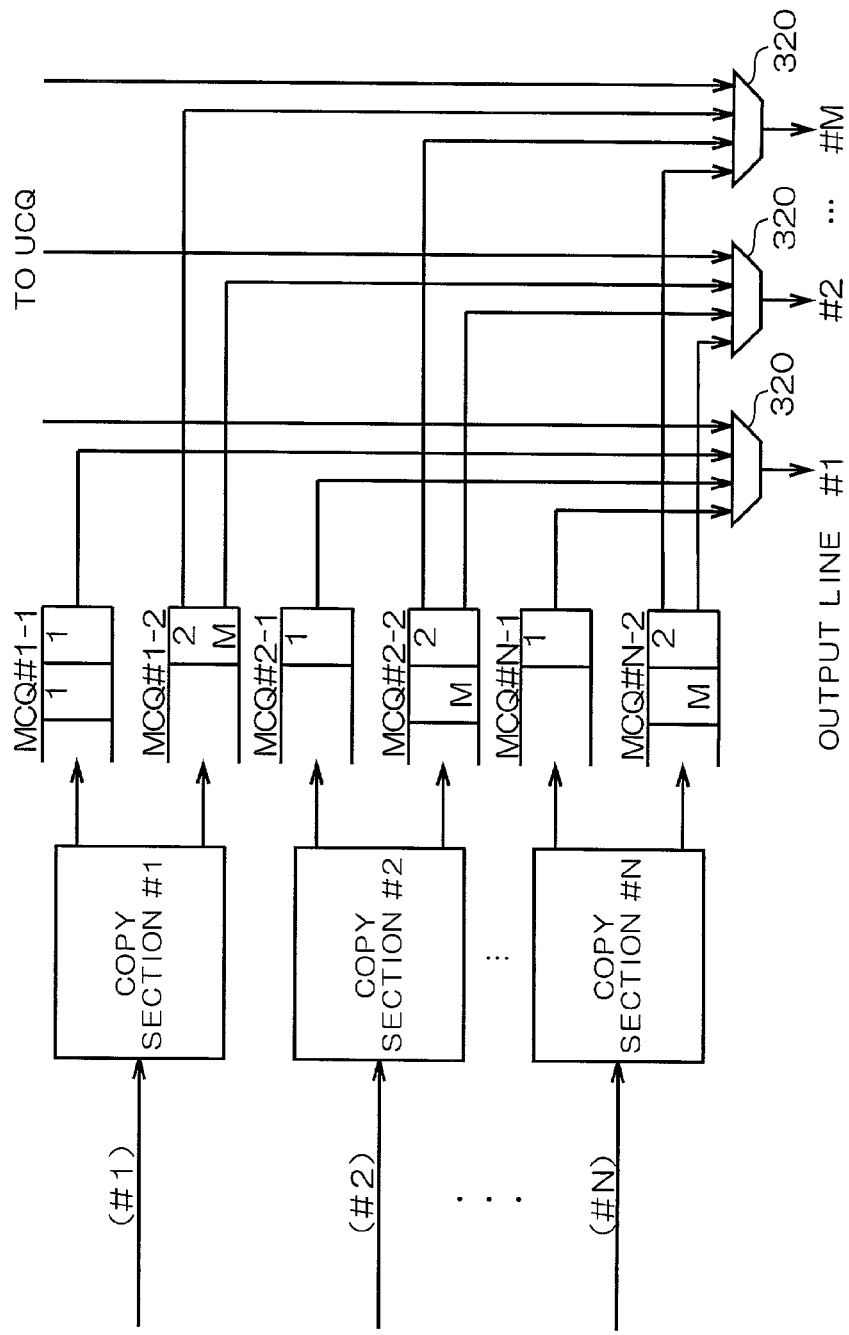
FIG. 9 shows a partial configuration showing an example of a variation of the crossbar switch section.

FIG. 9 shows the partial configuration of an example of a variation of the crossbar switch section. FIG. 9 shows the configuration corresponding to the N multicast queues MCQ #1 through #N contained in the crossbar switch section 300 shown in FIG. 8. For example, a copy section #1 and two multicast queues MCQ #1-1 and #1-2 shown in FIG. 9 correspond to the multicast queue MCQ #1 shown in FIG. 8. The copy section #1 copies a multicast packet read from the multicast queue MCQ #1 in the input buffer section #1 and input into the crossbar switch section 300, and stores two copies in the two multicast queues MCQ #1-1 and #1-2. The multicast queue MCQ #1-1 stores multicast packets whose destination output lines have odd numbers. The multicast queue MCQ #1-2 stores multicast packets whose destination output lines have even numbers. If the destination output line numbers are all odd numbers, then copied packets are stored only in the odd number multicast packet queue MCQ #1-1, and the copied packets are not stored in the even number multicast queue MCQ #1-2. This holds true with the case in which the destination output line numbers are all even numbers.

Thus, by copying an input multicast packet and dividing into plural sections, the rate of a HOL blocking can be reduced, thereby improving the throughput.

It has been conventional known that, when a packet is stored in a buffer for each input line, the problem of the HOL blocking occurs. That is, the leading packets conflict each other, the subsequent packets cannot be read, and the throughput is lowered down to 58.6% at worst. However, when the buffer is divided into a plurality of multicast queues MCQ respectively corresponding to input lines as shown in FIG. 9, the rate of conflicting packets is lowered, thereby improving the throughput as follows;

Throughput (%)=(1−(1−0.586)/number of divisions))×100

For example, when it is divided into two divisions the throughputs can be improved up to 79.3%.

In the above mentioned example, the multicast queues MCQ are divided into 2 divisions for odd destination output line numbers and even destination output line numbers, but can be divided into any number of divisions and in any other dividing methods. For example, when output lines are used in order from the smallest line number, the storage of copied packets can be allotted depending on the value obtained by dividing the output line number by the module of the divisor.

According to the above mentioned embodiment, the priority level is not assigned to each packet, but different priority levels can be assigned to different qualities of service QoS.

Figure 10:
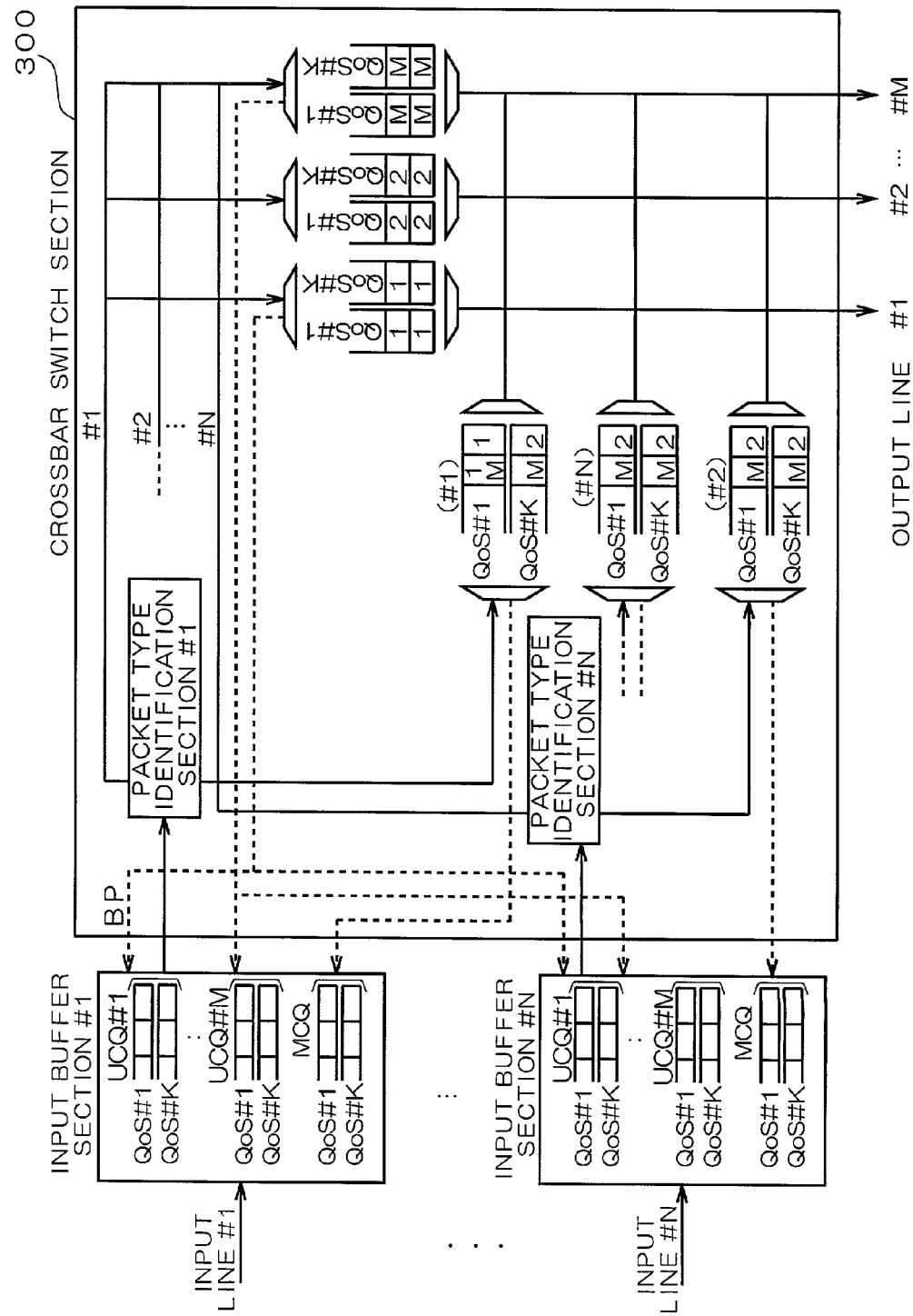
FIG. 10 shows an example of a variation of the packet switch in which various priority levels are assigned to packets.

FIG. 10 shows an example of a variation of a packet switch in which different priority levels are assigned to packets, and shows the configurations of an input buffer section and a crossbar switch section in the packet switch. Each of the input buffer sections #1 through #N comprises M sets of unicast queues UCQ #1 through #M respectively provided for M output lines, and a set of multicast queue MCQ provided for multicast packets. A set of unicast queue UCQ or a set of multicast queue MCQ contains a logic queue VOQ #1 (QoS #1 in FIG. 10) storing a packet having the quality of service QoS of a low priority level, and a logic queue VOQ #K (QoS #K) storing a packet having the quality of service QoS of a high priority level. For example, a packet requiring a band guarantee is stored in the logic queue VOQ #K, and a packet used in the best effort communications is stored in the logic queue VOQ #1. It is determined whether or not a priority level is high depending on the quality of service QoS in the fixed length packet shown in FIG. 3.

Thus, operations performed with the priority levels taken into account can be realized by separately storing packets having different priority levels.

For example, if the scheduler section 200 notifies each of the input buffer sections #1 through #N of a scheduling result, an instruction to read a packet from any unicast queue UCQ or multicast queue MCQ is issued, and packets are stored in both logic queue VOQ #1 and logic queue VOQ #K, then a packet which has a higher priority level and is stored in the logic queue VOQ #K is read by priority. Thus, packets can be transferred with the priority levels taken into account.

If a packet stored in the unicast queue UCQ or the multicast queue MCQ in the crossbar switch section 300 is to be read, and packets are stored in both logic queue VOQ #1 and logic queue VOQ #K, then a packet which has a higher priority level and is stored in the logic queue VOQ #K is read by priority. Thus, packets can be transferred with the priority levels taken into account.

Described below is the method of avoiding the conflict among multicast packets and unicast packets when a multicast packet is copied in the crossbar switch section 300.

Figure 11:
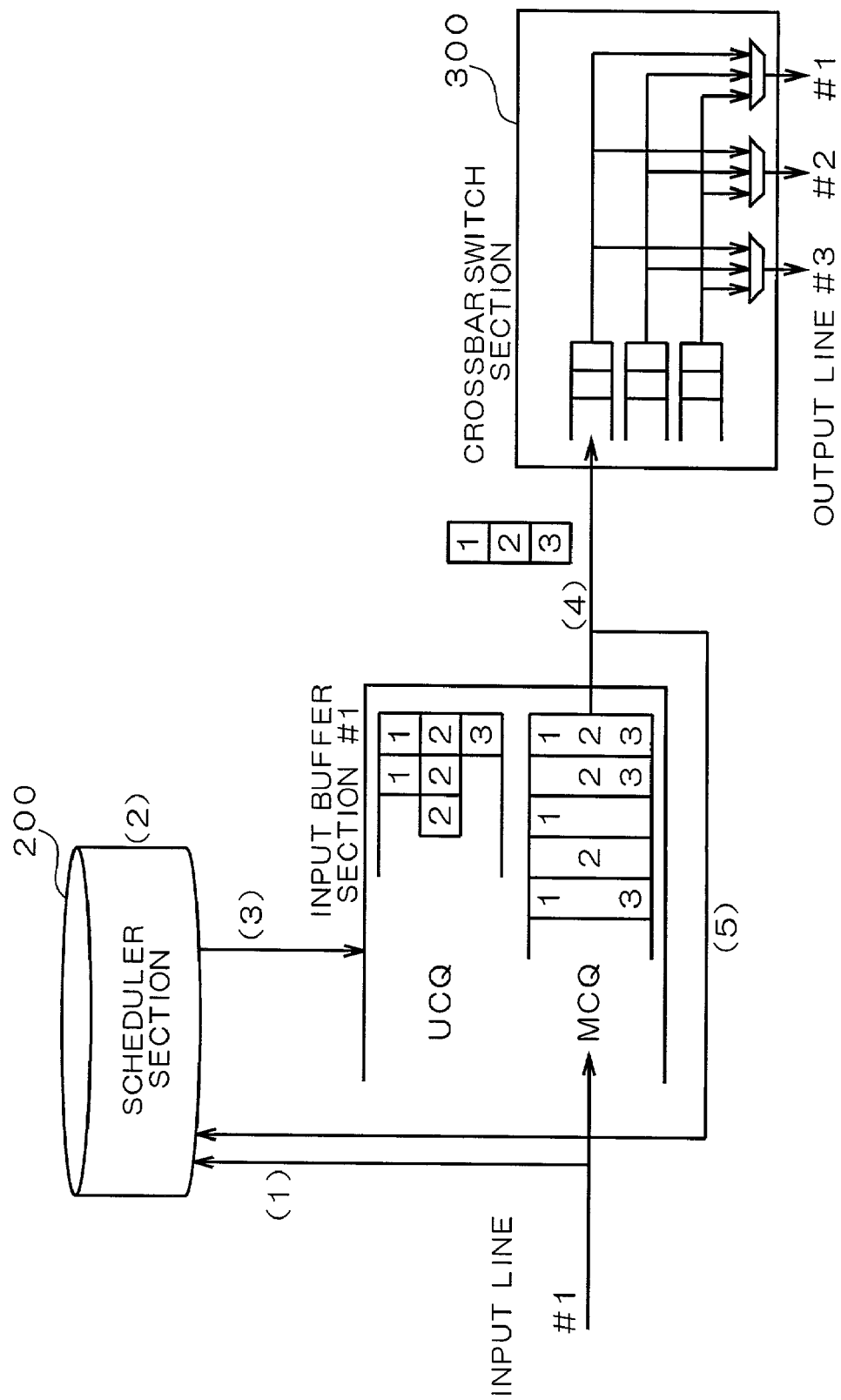
FIG. 11 shows an outline of a scheduling process for avoiding a conflict between multicast packets and unicast packets.

FIG. 11 shows an outline of the scheduling process of avoiding the conflict among multicast packets and unicast packets.

(1) The input buffer section (for example, #1) transmits a scheduling request to the scheduler section 200 when a multicast packet is to be stored in the multicast queue MCQ.

(2) The scheduler section 200 performs a scheduling process on the multicast packet at the received scheduling request.

(3) The scheduler section 200 transmits an instruction to read the multicast packet to the input buffer section #1 based on the result of the scheduling process.

(4) At the read instruction from the scheduler section 200, the input buffer section #1 reads the multicast packet stored at the head of the multicast queue MCQ, and transfers it to the crossbar switch section 300.

(5) The input buffer section #1 transmits a scheduling stop instruction for 1 time slot corresponding to the output line (for example, output lines #1, #2, and #3) which is the destination of the read multicast packet to the scheduler section 200.

Figure 12:
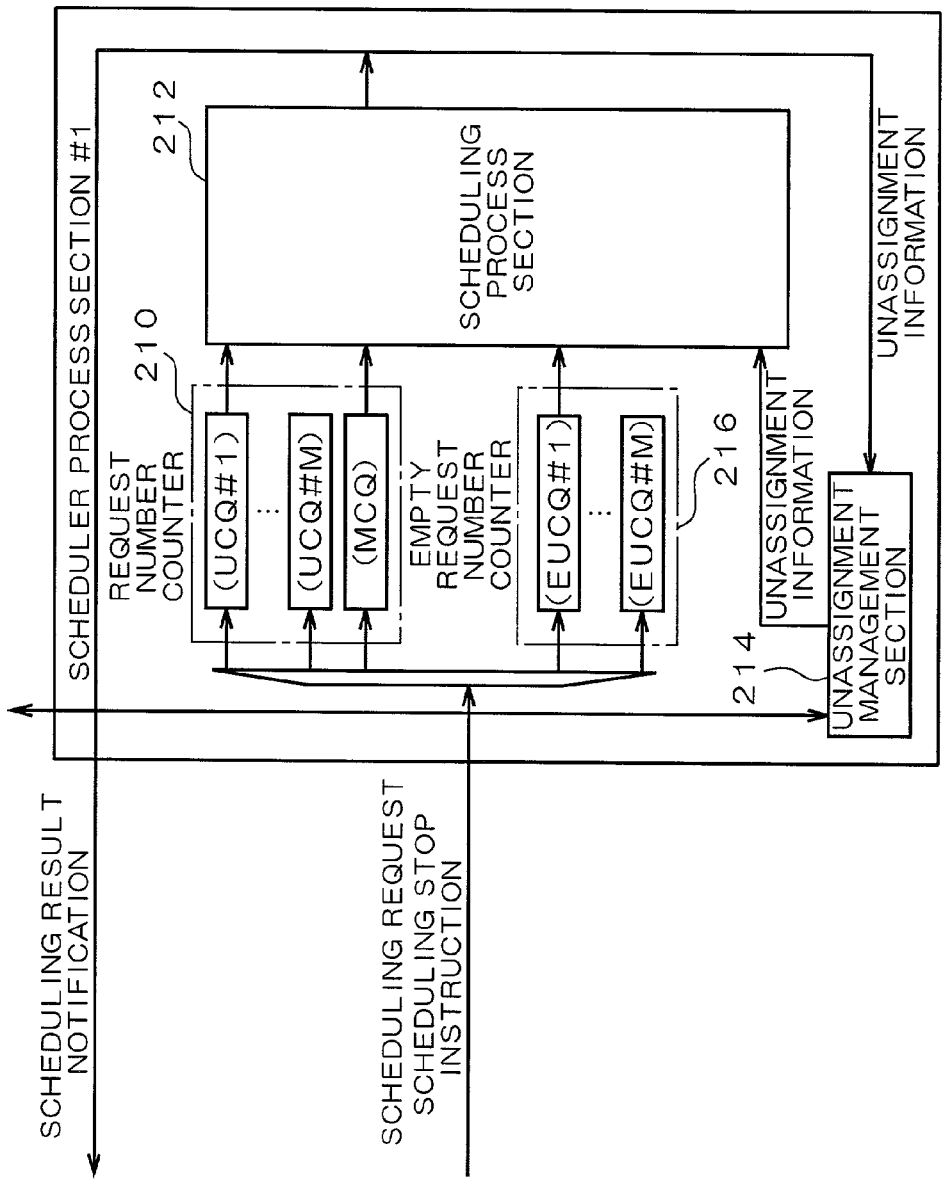
FIG. 12 shows a configuration of a scheduler process section for performing a scheduling process depending on an instruction to stop scheduling.

FIG. 12 shows the configuration of the scheduler process section performed depending on the scheduling stop instruction. In FIG. 12, the scheduler process section #1 corresponding to the input buffer section #1 is shown, but it holds true with other scheduler process sections #2 through #N in the scheduler section 200.

The scheduler process section #1 comprises a request number counter 210, a scheduling process section 212, a unassignment management section 214, and an empty request number counter 216. It is different from the configuration shown in FIG. 4 in that the empty request number counter 216 is newly added. The empty request number counter 216 counts the frequency of received stop instructions for each of the target output lines (hereinafter referred to as an 'empty request number') when it receives a scheduling stop instruction from the input buffer section #1. Otherwise, instead of issuing the scheduling stop instruction in (5) above, the scheduling process section 212 can manage the output line information for each multicast packet, and instruct the empty request number counter to count the frequency when an instruction to read a multicast is issued in (3) above. The scheduling process section 212 performs a scheduling process on other output lines with the output lines having the empty request numbers equal to or larger than 1 excluded from the scheduling process targets. In each of the scheduling processes of the input buffer sections #1 through #N performed in 1 packet hour, it is necessary to exclude from the process targets the output lines on which the scheduling process is to be stopped. Therefore, the information from the empty request number counter 216 is transferred from the input buffer section #1 to the other input buffer sections #2 through #N. The transfer is performed by, for example, the unassignment management section 214.

Thus, when a multicast packet is read from the input buffer section #1 and input into the crossbar switch section 300, there can be the conflict among multicast packet destination output lines by reading a unicast packet. Therefore, reading a unicast packet is temporarily stopped to reduce the conflict among the output lines in the crossbar switch section 300. Thus, the requirements for the capacity of the buffer in the crossbar switch section 300 can be minimized.

Figure 13:
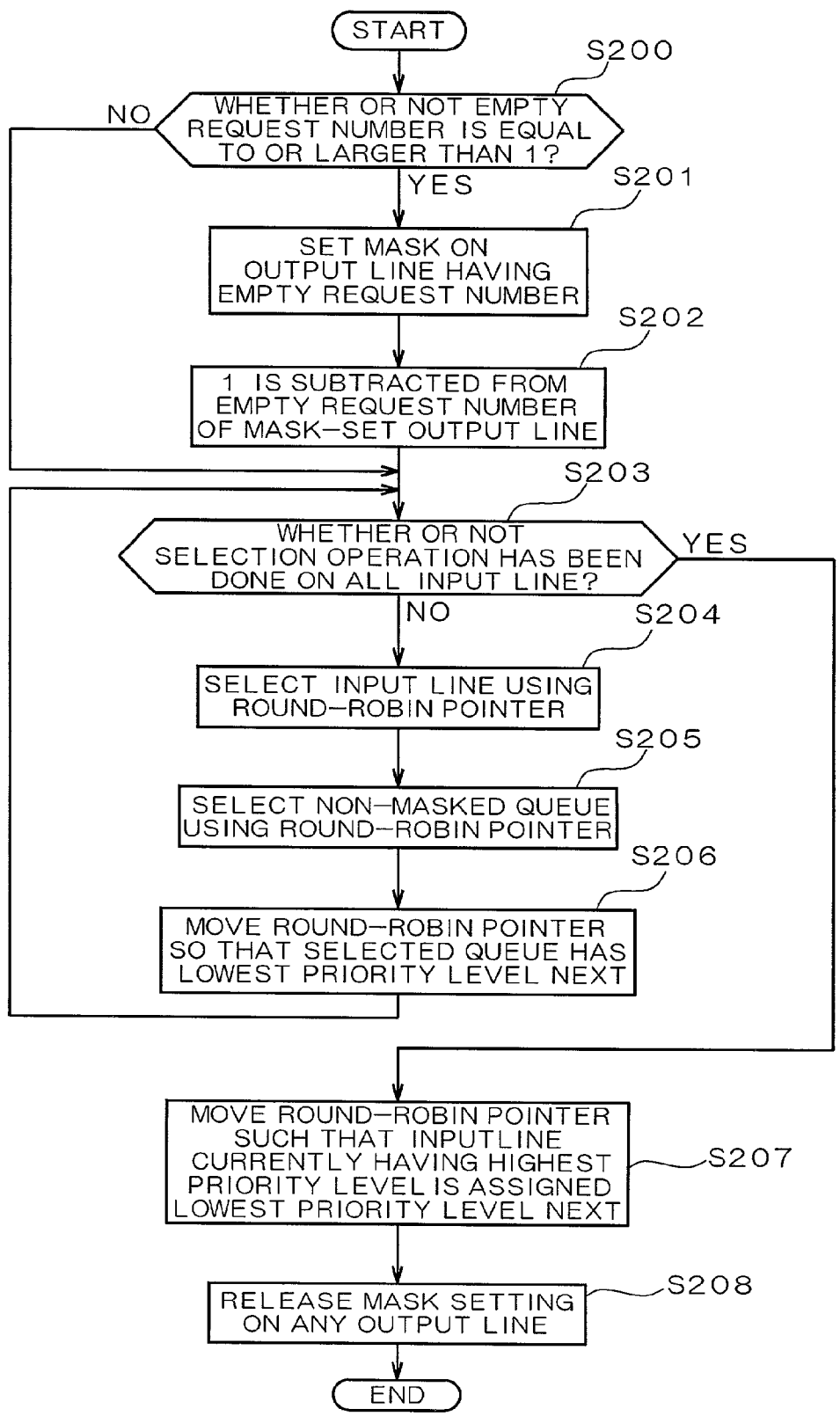
FIG. 13 is a flowchart of a practical example of a scheduling process based on the number of empty requests in the scheduler section.

FIG. 13 is a flowchart of a practical example of the scheduling process with the empty request number in the scheduler section 200 taken into account, and shows the procedure of the operation performed using a round-robin pointer. FIGS. 14A through 14D show practical examples of the scheduling process using a round-robin pointer. In each of FIGS. 14A through 14C, an output line number enclosed by a square indicates that a scheduling stop instruction is issued for the output line.

In the scheduler process sections #1 through #N in the scheduler section 200, the empty request number counter 216 is referred to using the round-robin pointer for the section corresponding to the input line having the highest priority level to determine whether or not the empty request number is equal to or larger than 1 (step S200). Affirmative determination is made at least when the empty request number for one output line is equal to or larger than 1, each of the scheduler process sections #1 through #N sets a mask on the output lines having the empty request number equal to or larger than 1 to be excluded from selection targets (step S201), and 1 is subtracted from the empty request number of the mask-set output lines (step S202). In the example shown in FIG. 14A, a mask is set on the output lines #2 and #M.

Then, each of the scheduler process sections #1 through #N determines whether or not an operation of selecting a queue to be read has been performed on all input lines (step S203). When there is an input line on which the queue selecting operation has not been performed, the negative determination is made and an operation is started by the scheduler process section corresponding to the input line.

First, each of the scheduler process sections #1 through #N selects using the round-robin pointer an input line on which the scheduling process is to be performed (step S204). In the example shown in FIG. 14A, since the round-robin pointer for selection of an input line is located in the position of the input line #1, the input line #1 is first selected as a process target.

Figure 14A:
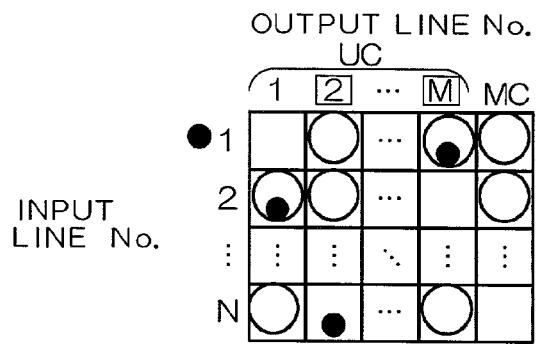
FIGS. 14A through 14D show practical scheduling processes performed using a round-robin pointer.
Figure 14B:
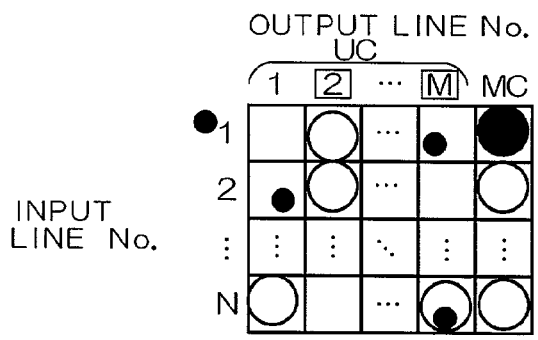
Figure 14C:
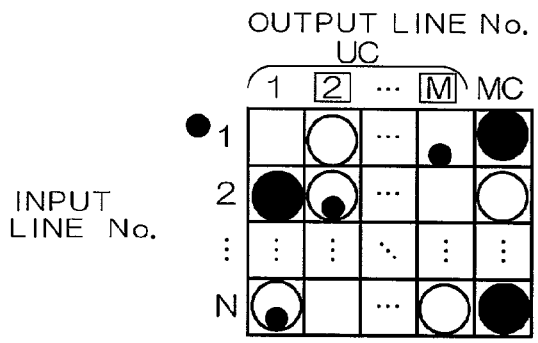

Then, the scheduler process section #1 corresponding to the selected input line #1 selects using the round-robin pointer a queue to be read from the non-masked unicast queues UCQ or multicast queues MCQ (step S205). In the example shown in FIG. 14A, although the round-robin pointer is located in the position corresponding to the M-th unicast queue UCQ, the output line M is mask-set. Therefore, a predetermined order is followed, and a queue corresponding to the first non-masked output line receiving the scheduling request (for example, the multicast queue MCQ) is selected. If a multicast queue MCQ is selected, the scheduler process section #1 moves the round-robin pointer into the position of the first unicast queue UCQ such that the selected multicast queue MCQ can be assigned the lowest priority level as shown in FIG. 14B. Otherwise, if there are packets, but a packet cannot be selected because it is masked or the output line is specified corresponding another input line, then it is not necessary to move the round-robin pointer so that the high priority level can be maintained for the next packet (step S206).

When the scheduling process for the input line #1 is completed, control is returned to step S203, and a scheduling process is performed on other input lines for which no read queues have been selected. Thus, a queue from which a packet is to be read is selected for each of the N input lines #1 through #N. For example, in the example shown in FIG. 14C, the multicast queue MCQ is selected corresponding to the input line #1, the unicast queue UCQ #1 is selected corresponding to the input line #2, . . . , the multicast queue MCQ is selected corresponding to the input line #N.

Figure 14D:
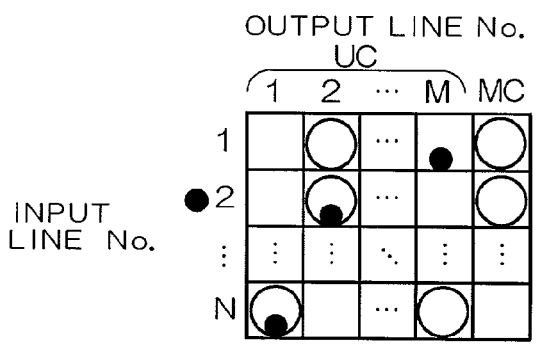

When the selecting process is completed on all input lines, the affirmative determination is made in step S203, each of the scheduler process sections #1 through #N moves the position of the round-robin pointer such that the input line currently having the highest priority level is assigned the lowest priority level in the next process (step S207). In the example shown in FIGS. 14A through 14C, the input line #1 currently has the highest priority level. Therefore, the position of the round-robin pointer is moved such that the next input line #2 can be assigned the highest priority level, and the input line #1 can be assigned the lowest priority level in the next process as shown in FIG. 14D. Then, each of the scheduler process sections #1 through #N releases the mask setting on any output line (step S208).

Second Embodiment

Described below will be a packet switch according to a second embodiment of the present invention. The packet switch according to the present embodiment can realize a high-speed process by using in parallel a plurality of crossbar switch sections 300 of the first embodiment.

Figure 15:
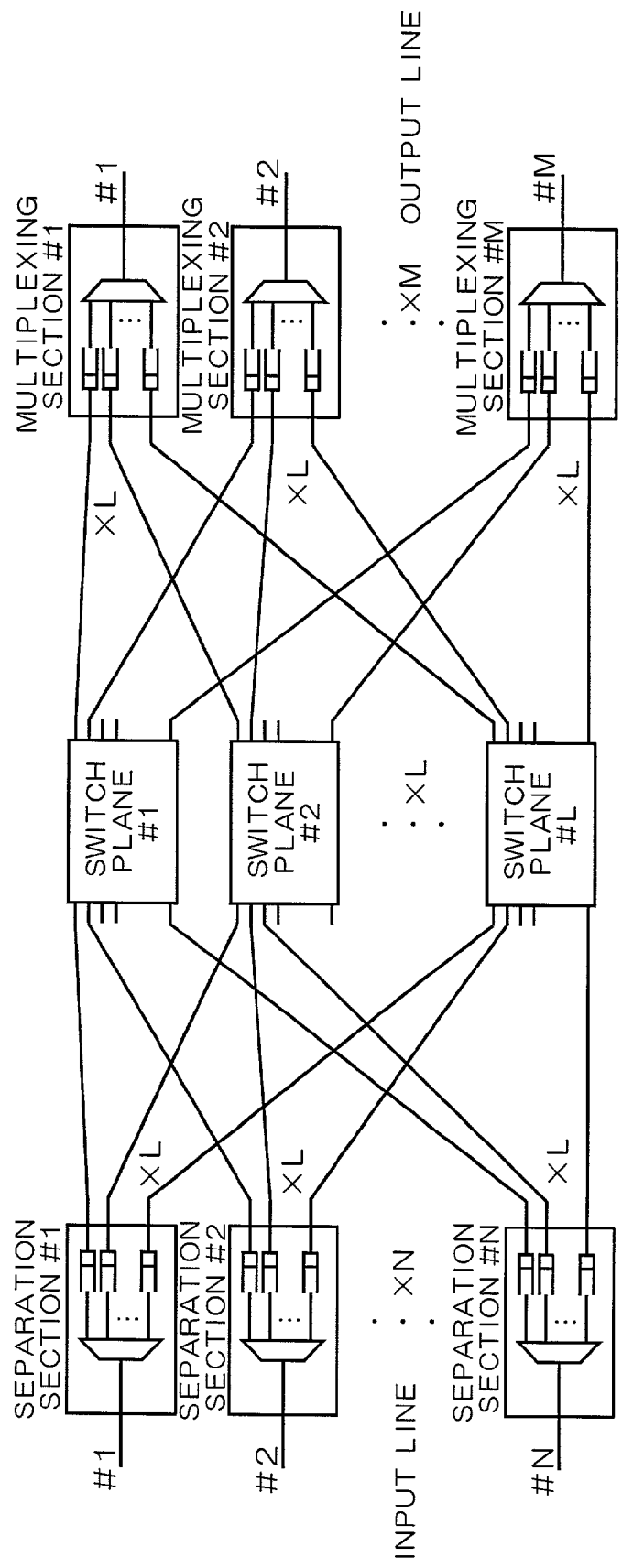
FIG. 15 shows a configuration of the packet switch according to a second embodiment of the present invention.
Figure 16:
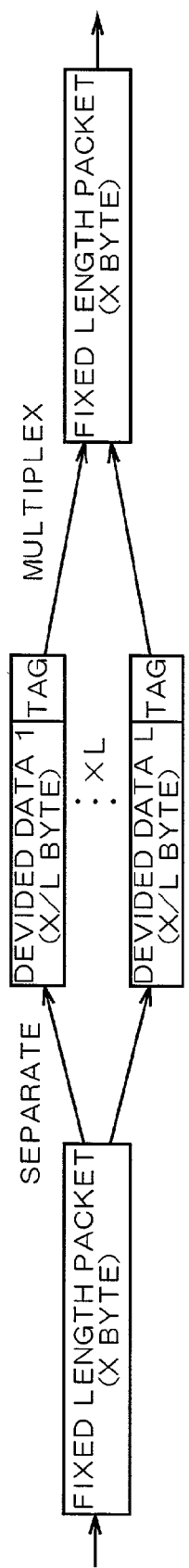
FIG. 16 shows a principle of an operation of the packet switch according to a second embodiment of the present invention.

FIG. 15 shows a configuration of the packet switch according to the present embodiment. FIG. 16 shows a principle of an operation of the packet switch according to the present embodiment. A configuration shown in FIG. 15 corresponds to a part of the packet switch shown in FIG. 1. In the packet switch, the input buffer section 100, the scheduler section 200, the frame assembly buffer section 400, and the framing process section 500 are contained. Each of L switch planes #1 through #L shown in FIG. 15 is functionally the same as the crossbar switch section 300 shown in FIG. 1, etc., and the detailed explanation of the contents are omitted here.

Each of the separation sections #1 through #N is provided at the subsequent stage of each of the N input buffer sections #1 through #N, and receives a fixed length packet output from the corresponding input buffer sections #1 through #N. The separation sections #1 through #N divide an input fixed length packet into L divisions in bit unit from the head, adds predetermined tag information (TAG) to each piece of the divided data 1 through L, and output them. The added tag information is the TAG identification contained in the fixed length format as shown in FIG. 3, or the equivalent contents. That is, the tag information contains the information specifying an output line (output port) for a unicast packet, and contains the information specifying a plurality of output lines (output ports) for a multicast packet. After switching a path in each of the switch planes #1 through #L, the information about a destination output port is not required. Therefore, the tag information is overwritten by the information specifying an input line (input port) into which a fixed length packet is input. The overwriting information is referred to later when a variable length frame is regenerated by the frame assembly buffer section 400 at the subsequent stage.

Thus, by performing concurrent switching processes on fixed length packets using the L switch planes #1 through #L, the load of the process on each switch plane can be reduced, thereby realizing a high-speed transfer. Especially, by increasing and decreasing the number L of switch planes, processes can be performed at various communications speeds, thereby realizing a excellent general-purpose packet switch.

Figure 17:
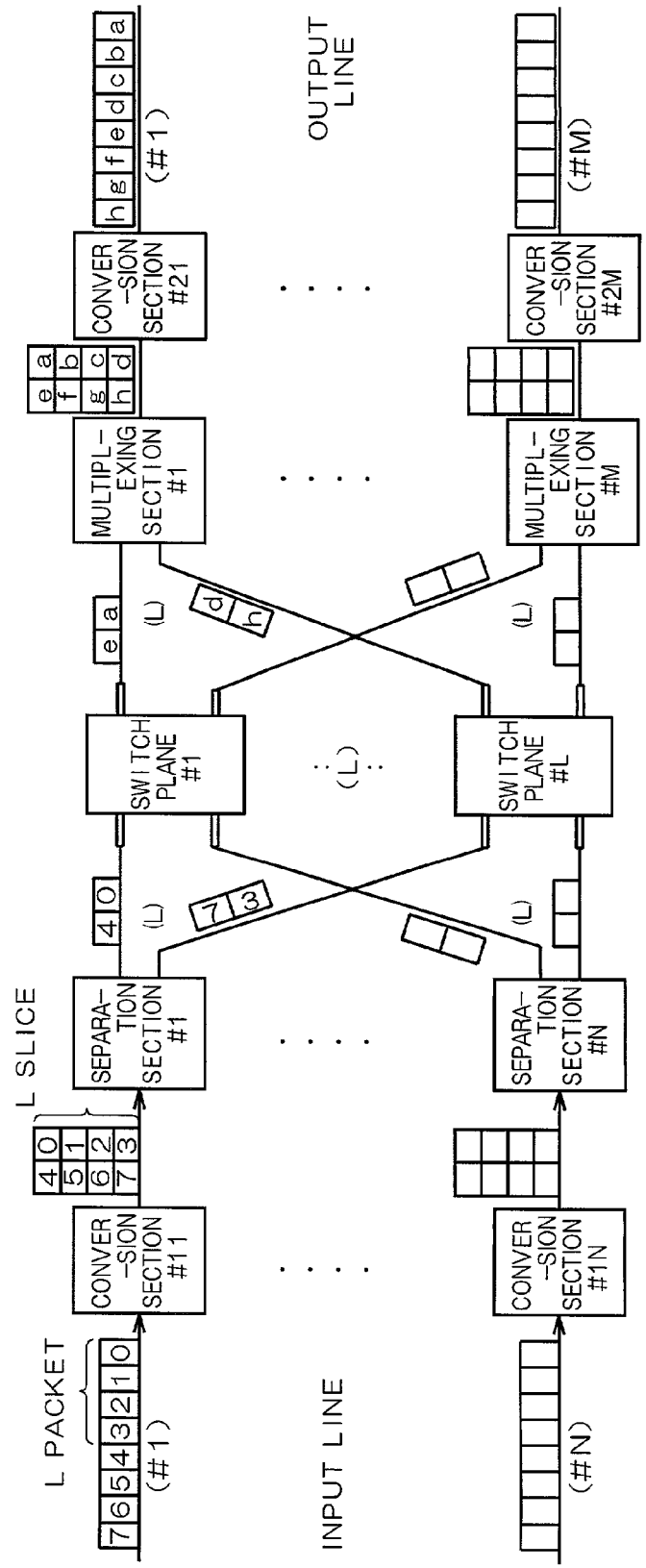
FIG. 17 shows an example of a variation of the packet switch according to a second embodiment of the present invention.

FIG. 17 shows an example of a variation of the packet switch according to the present embodiment. As described above, when a bit slice method of dividing an input fixed length packet in bit unit sequentially from the head of the packet, one fixed length packet is divided into L divisions, and transmitted to L switch planes #1 through #L. In this case, if any of the switch planes #1 through #L becomes faulty, then data cannot be normally transferred. However, using the configuration shown in FIG. 17, the inconvenience can be avoided.

The packet switch shown in FIG. 17 is different from the switch shown in FIG. 15 in that N conversion sections #11 through #1N are provided before separation sections #1 through #N, and M conversion sections #21 through #2M are provided after multiplexing sections #1 through #M. Each of the conversion sections #11 through #1N rearranges input fixed length packets as a unit in L switch planes. For example, if four switch planes #1 through #4 are provided, data is rearranged in bit unit such that bit data forming four fixed length packets can be output in parallel each time four fixed length packets are input. Since a plurality of fixed length packets are output in parallel, one fixed length packet is output in plural packet hours.

In addition, each of the conversion sections #21 through #2M rearranges the data output from each of the corresponding multiplexing sections #1 through #M, and outputs the data in a fixed length packet unit. In the process of rearranging the data by each of the separation sections #1 through #N, each of the switch planes #1 through #L outputs divided data of different fixed length packets in parallel. In each of the conversion sections #21 through #2M, the output timing of each fixed length packet can be separated in a time division manner by rearranging the simultaneously output data.

Thus, by inputting the data rearranged by each of the conversion sections #11 through #1N into the separation sections #1 through #N, each fixed length packet output from each of the separation sections #1 through #N can be prevented from being divided and input into a plurality of switch planes. Thus, although any of the switch planes becomes faulty, a normal switch plane can replace the faulty unit and can transfer a fixed length packet.

Figure 18:
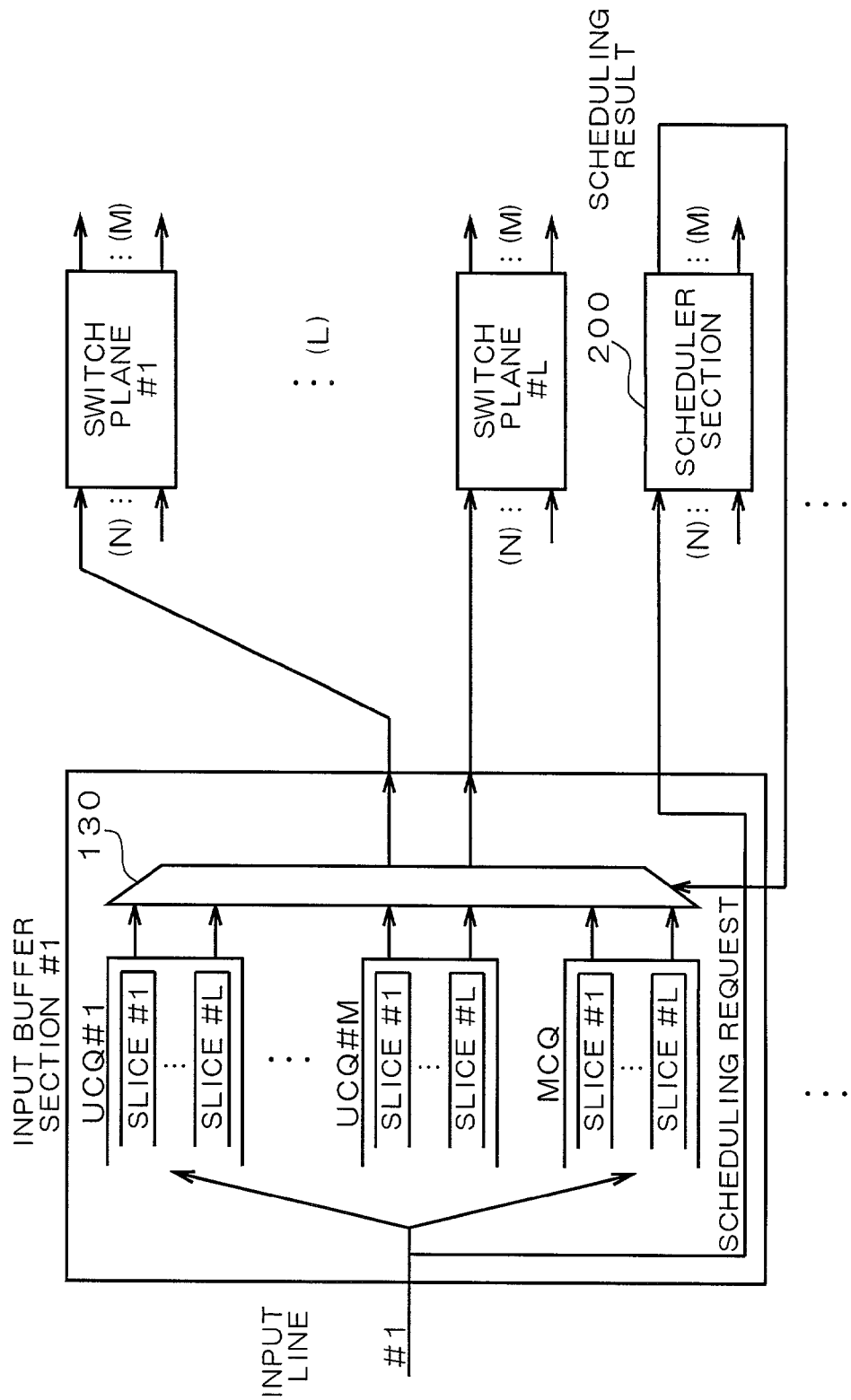
FIG. 18 shows a configuration of an input buffer section for realizing the operation of the packet switch shown in FIG. 17.

FIG. 18 shows a configuration of the input buffer section for realizing the operation of the packet switch shown in FIG. 17. With the configuration shown in FIG. 17, various processes in the conversion sections #11 through #1N and the separation sections #1 through #N can be performed on the fixed length packets output from the input buffer section provided corresponding to each input line. However, in FIG. 18, these functions are assigned to the input buffer sections. In FIG. 18, only the configuration of the input buffer section #1 is shown, but the other input buffer sections #2 through #N have the same configurations.

The input buffer section #1 shown in FIG. 18 comprises M unicast queues UCQ #1 through #M respectively corresponding to M output lines, a multicast queue MCQ, and a selector 130 for selectively reading and outputting packets stored in various queues.

Each of the unicast queues UCQ #1 through #M has L storage regions (slices #1 through #L) one to one respectively corresponding to L switch planes #1 through #L. For example, when fixed length packets to be output to the output line #1 are input, the first packet is stored in the storage region specified by the slice #1 of the unicast queue UCQ #1, and the second packet is stored in the storage region specified by the slice #2. The similar processes are performed on the third and subsequent fixed length packets. That is, they are sequentially stored in the third and subsequent storage regions specified by and subsequent to the slice #3. When the fixed length packet is stored in the storage region specified by the slice #L, a scheduling request for the L fixed length packets is transmitted to the scheduler section 200. When a scheduling result is transmitted from the scheduler section 200 as a read instruction through the output line #1, the selector 130 simultaneously reads the packets stored in the L storage regions of the unicast queue UCQ #1, and transmits them to the L switch planes #1 through #L respectively. The same processes are performed on the other unicast queues UCQ #2 to #M and the multicast queue MCQ. That is, the packets are simultaneously read when L fixed length packets are stored.

In the examples shown in FIGS. 17 and 18, a fixed length packet is not divided into a plurality of switch planes, but is transmitted to one switch plane. Therefore, in these cases, it is not necessary to add new tag information as shown in FIGS. 15 and 16.

In the packet switch shown in FIG. 17, different fixed length packets are transmitted to each switch plane #1. Therefore, the order of the packets can be changed even if they are assigned the same destination input line. In such cases, it is necessary to rearranged the order of the packets arranged in order of reception.

Figure 19:
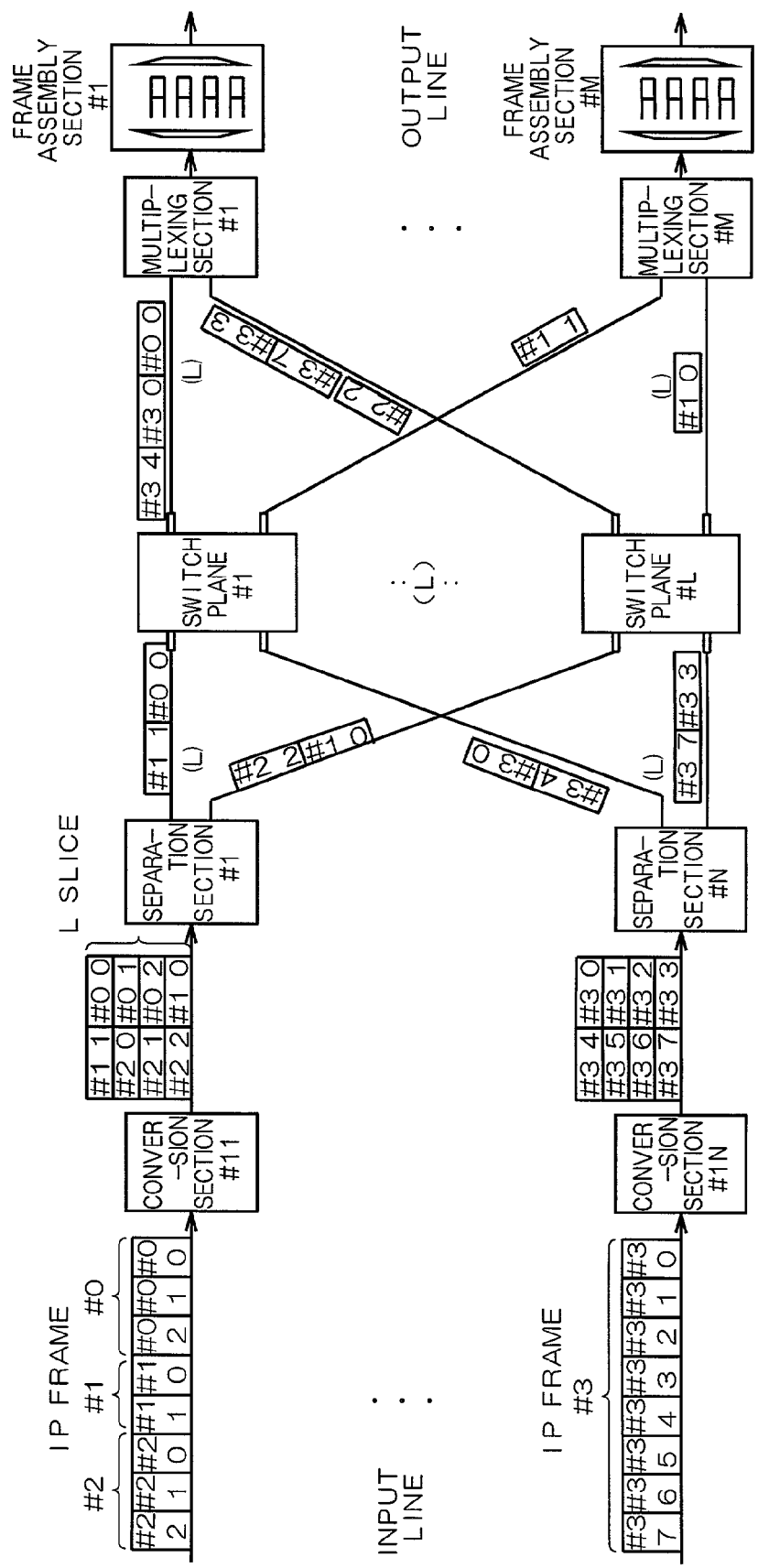
FIG. 19 shows a configuration of the packet switch for forming a frame with an order of packets taken into account.

FIG. 19 shows a configuration of the packet switch in which a frame is generated with the order of packets taken into account. The packet switch shown in FIG. 19 is different from the packet switch shown in FIG. 17 in that the conversion sections #21 through #2M provided after the multiplexing sections #1 through #M are replaced with the frame assembly sections #1 through #M. Each of the frame assembly sections #1 through #M has the function of the conversion section 21, etc., and performs the operation of generating a variable length frame by rearranging a plurality of fixed length packets arriving in random order.

Each of the frame assembly sections #1 through #M comprises a packet buffer for sequentially storing a plurality of fixed length packets which are output in parallel from the corresponding multiplexing sections #1 through #M and separated in time; an address management table for management of the storage address of the packet buffer; and a read management section for reading the packets stored in the packet buffer in a predetermined order.

Figure 20:
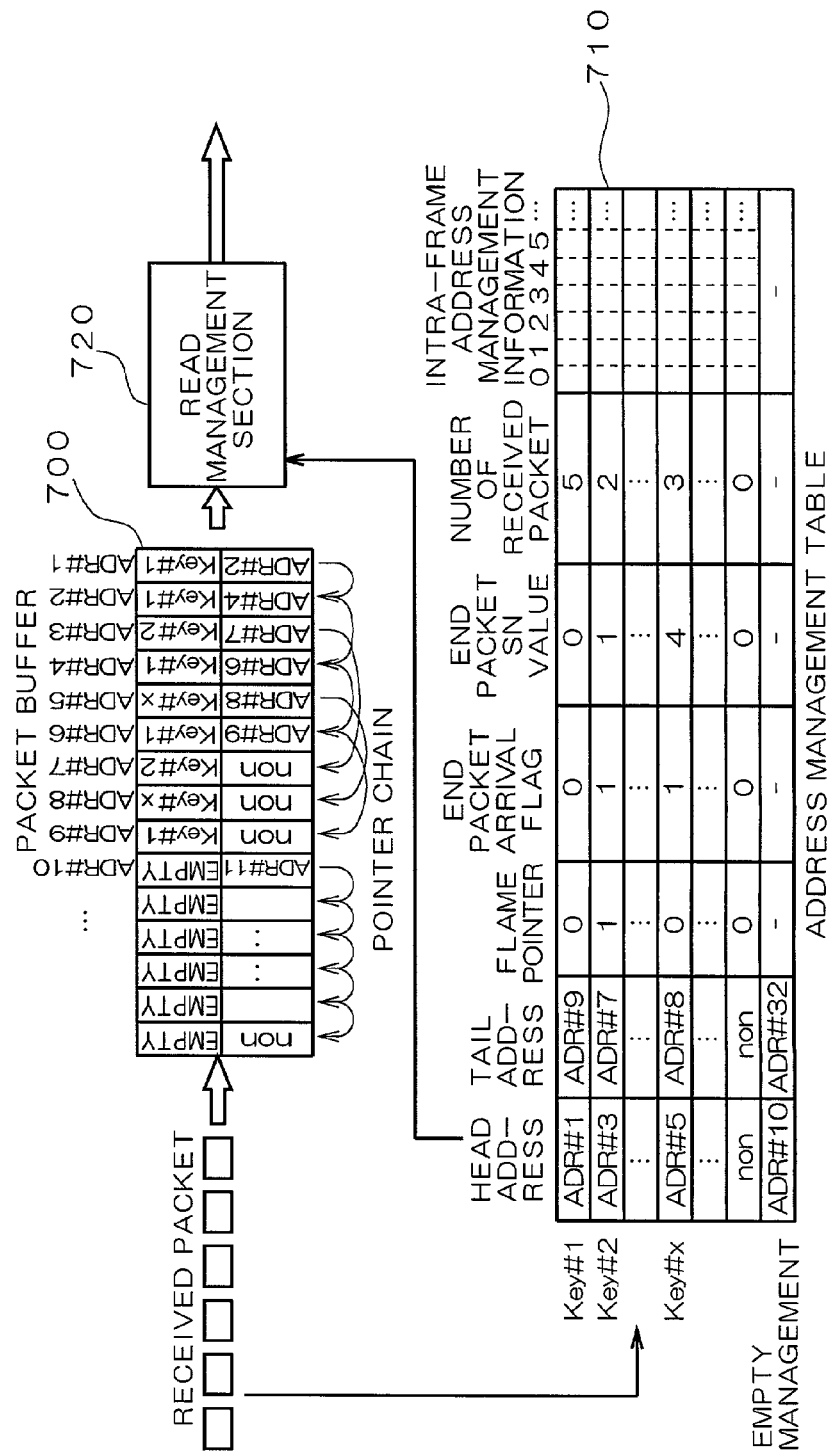
FIG. 20 shows an internal configuration of each frame assembly section shown in FIG. 19.

FIG. 20 shows an internal configuration of each frame assembly section shown in FIG. 19.

As shown in FIG. 20, a packet buffer 700 stores packets input in order of reception (in order of separation) together with key information (Key) at a predetermined address. The key information can be the header of a corresponding packet, and contains a multicast identification M, an input line number, and a frame number (sequence number identifying the order of the frame). The multicast identification M is "1" for a unicast packet, and "0" for a multicast packet. The packet buffer 700 stores pointer chain information indicating the association with the packet forming a frame. The pointer chain information indicates the address at which the subsequent packet to a target packet is stored. By tracing the addresses, a plurality of packets forming a frame can be sequentially read.

In addition, the address management table stores detailed information for each of the stored packets, and contains a head address, a tail address, a frame pointer, an end packet arrival flag, an end packet SN value, the number of received packets, and intra-frame address management information. The head address indicates the storage address of the leading packet forming a frame, and the tail address indicates the storage address of the end packet. The frame pointer is set to "1" when all of the plural packets have been received and can be read. The end packet arrival flag is set when the end packet is stored. The end packet SN (Sequence Number) value is a sequence number allotted to the end packet. The packets are sequentially assigned the sequence numbers 0, 1, 2, . . . from the leading packet. Therefore, if n packets forms 1 frame, the value is n−1. The number of received packets is the number of packets already stored. If the number matches the value obtained by adding 1 to the end packet SN value after storing the end packet, then it is determined that all packets forming one frame have been received. An address management table 710 contains the head address and the tail address of an empty management queue, and shows unused storage regions of a packet in the packet buffer 700.

Figure 21:
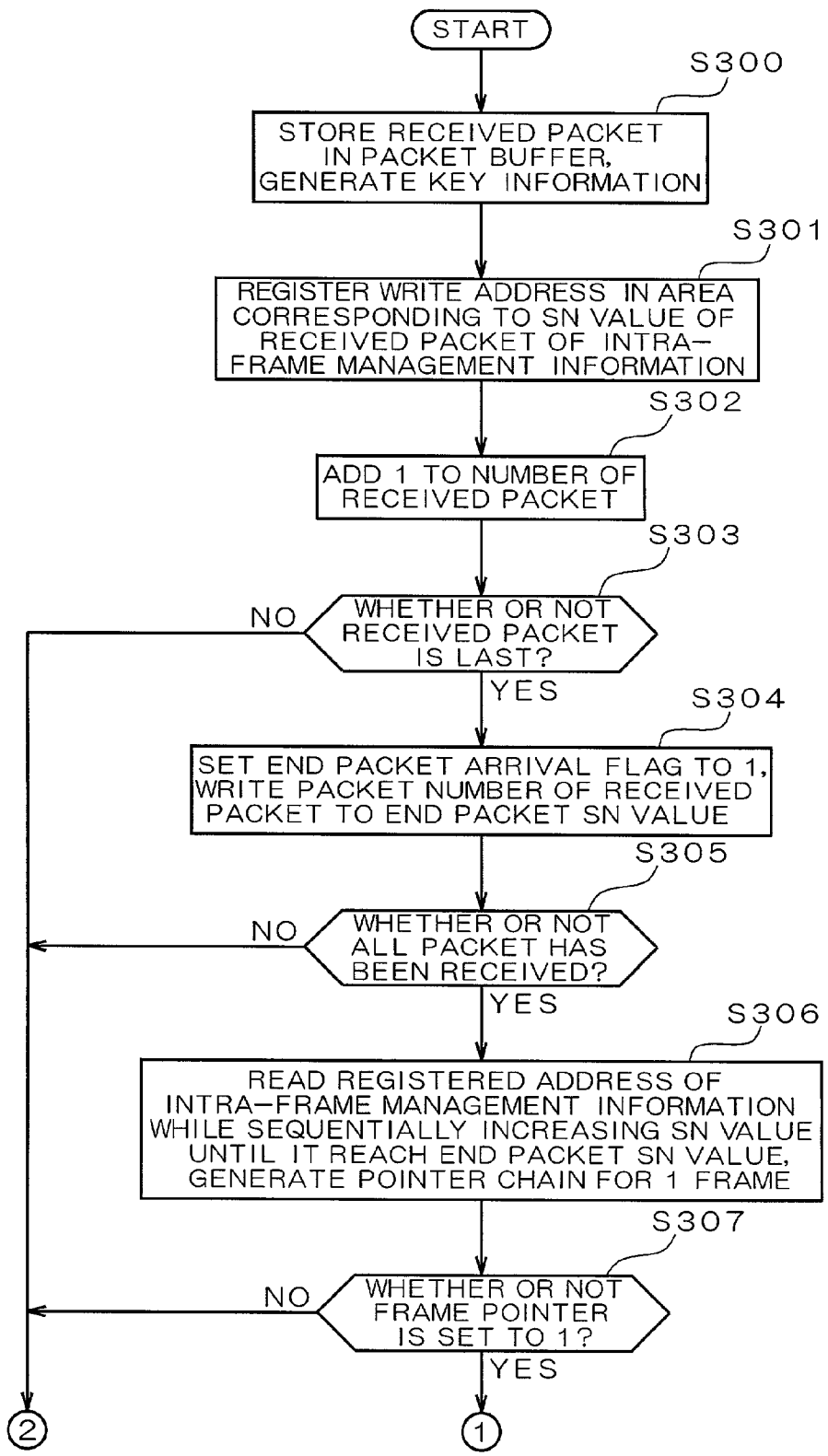
FIG. 21 is a flowchart of a procedure of an operation of a frame assembly section whose practical example is shown in FIG. 19.
Figure 22:
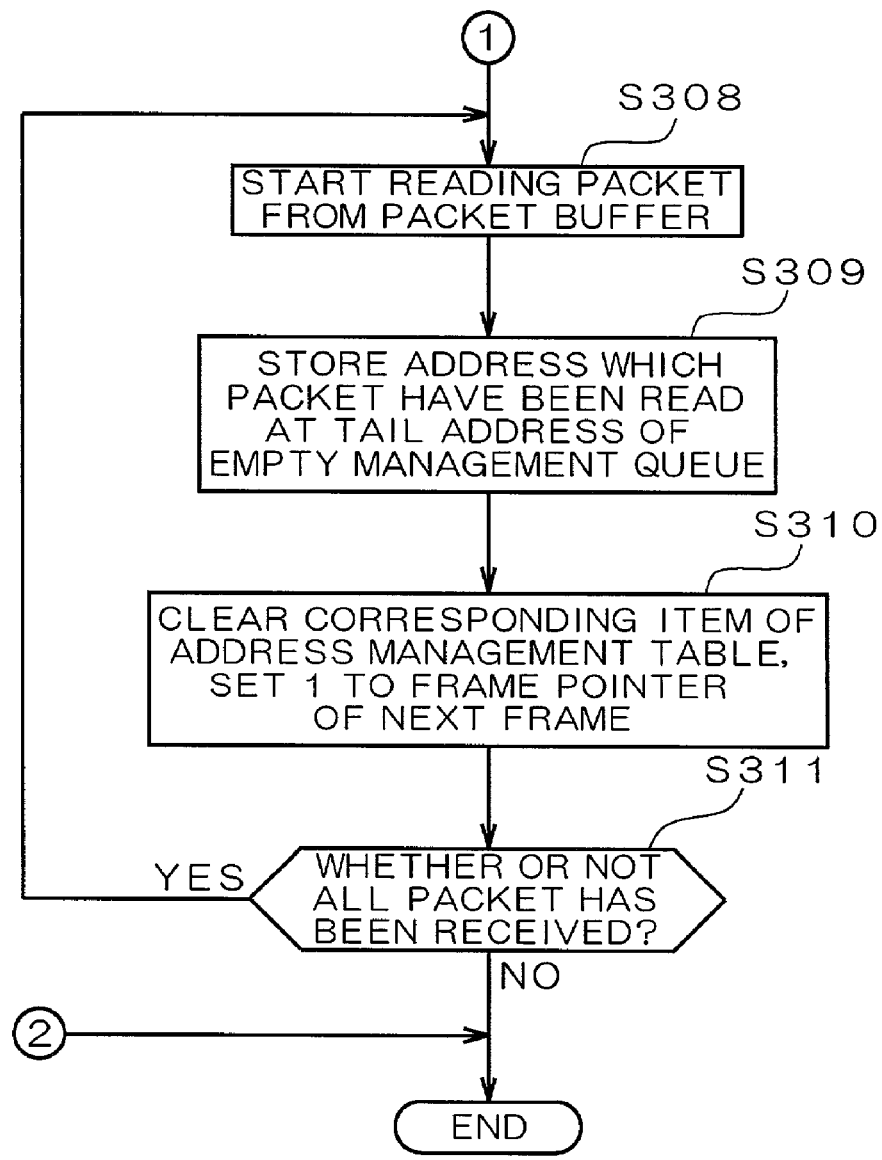
FIG. 22 is a flowchart of the procedure of the operation of the frame assembly section whose practical example is shown in FIG. 19.

FIGS. 21 and 22 are flowcharts of the procedure of the operation of the frame assembly section whose practical example is shown in FIG. 19.

The frame assembly section stores a received packet at the head of the empty area of the packet buffer 700, and generates the key information about the address management table according to the header information about the received packet (step S300). The frame assembly section registers a write address of the packet buffer 700 in the area corresponding to the Sn value of the received packet of the intra-frame address management information corresponding to the key information (step S301).

Then, the frame assembly section adds 1 to the number of received packets corresponding to the key information (step S302), and then determines whether or not the received packet is the end packet (step S303). If it is the end packet, affirmative determination is made, and the frame assembly section sets an end packet arrival flag corresponding to the key information, and sets the packet number of the received packet to the end packet SN value corresponding to the key information (step S304).

Then, the frame assembly section checks whether or not the value obtained by adding 1 to the end packet SN value matches the number of received packets, and determines whether or not all packets in the frame have been received (step S305). If all packets have not been received, then negative determination is made, and the frame assembly section enters a wait state.

If all packets have been received, affirmative determination is made in step S305, and then the frame assembly section sequentially reads the registered addresses of the intra-frame address management information corresponding to the key information while sequentially increasing the SN value until it reaches the end packet SN value, and generates a pointer chain for 1 frame (step S306). At this time, the registered address having the SN value of 0 is stored as the head address of the address management table, and the last address being read is stored as the tail address.

Then, the frame assembly section determines whether or not the frame pointer is set to 1 (step S307). If it is not 1, then negative determination is made, and the frame assembly section enters a wait state.

If the frame pointer is 1, affirmative determination is made in step S307, and then the frame assembly section transfers the head address corresponding to the key information to a read management section 720. The read management section 720 sequentially traces addresses from the head address, and starts reading packets from the packet buffer 700 while decrementing the number of received packets (step S308). At this time, the read management section 720 stores the address of the packet buffer 700 at which all packets have been read as the tail address of the empty management queue in the address management table (step S309). In addition, the read management section 720 reads packets of one frame, then clears the contents of the corresponding items (the end packet arrival flag, the end packet SN value, and the frame pointer) in the address management table, retrieves the next frame information (for example, by obtaining it using the maximum value of the (key number+1)% frame number), and sets the frame pointer corresponding to the key information to "1" (step S310).

Then, the frame assembly section checks whether or not the value obtained by adding 1 to the end packet SN value corresponding to the key information matches the number of received packets, thereby determining whether or not all packets in the next frame have been received (step S311). If all packets have not been received, then negative determination is made, and the frame assembly section enters a wait state. If all packets have been received, then the packet reading process and the subsequent processes are repeated in step S308.

Thus, by the frame assembly section managing the order, etc. of each packet forming part of one frame and sequentially reading the packets, the packets can be sequentially read from the head of a frame regardless of the order of reception of the packets.

The number (maximum value) of the frame numbers contained in the above mentioned key information can be obtained by the following equation by estimating the maximum number of smallest size of frames passing within a time taken for the congestion of a switch plane when the maximum size of supported frame is allotted to each switch plane and transferred.

a number of frame numbers=(number of packets of maximum size frame/number of switch planes)× number of output lines The frame number with which a frame has been completely generated can be transmitted as a notification to the corresponding input line. On the input line side (for example, the input buffer section and the scheduler section), the same frame number cannot be used until the frame number notification is issued, thereby protecting the frame numbers from overlapping.

Figure 23:
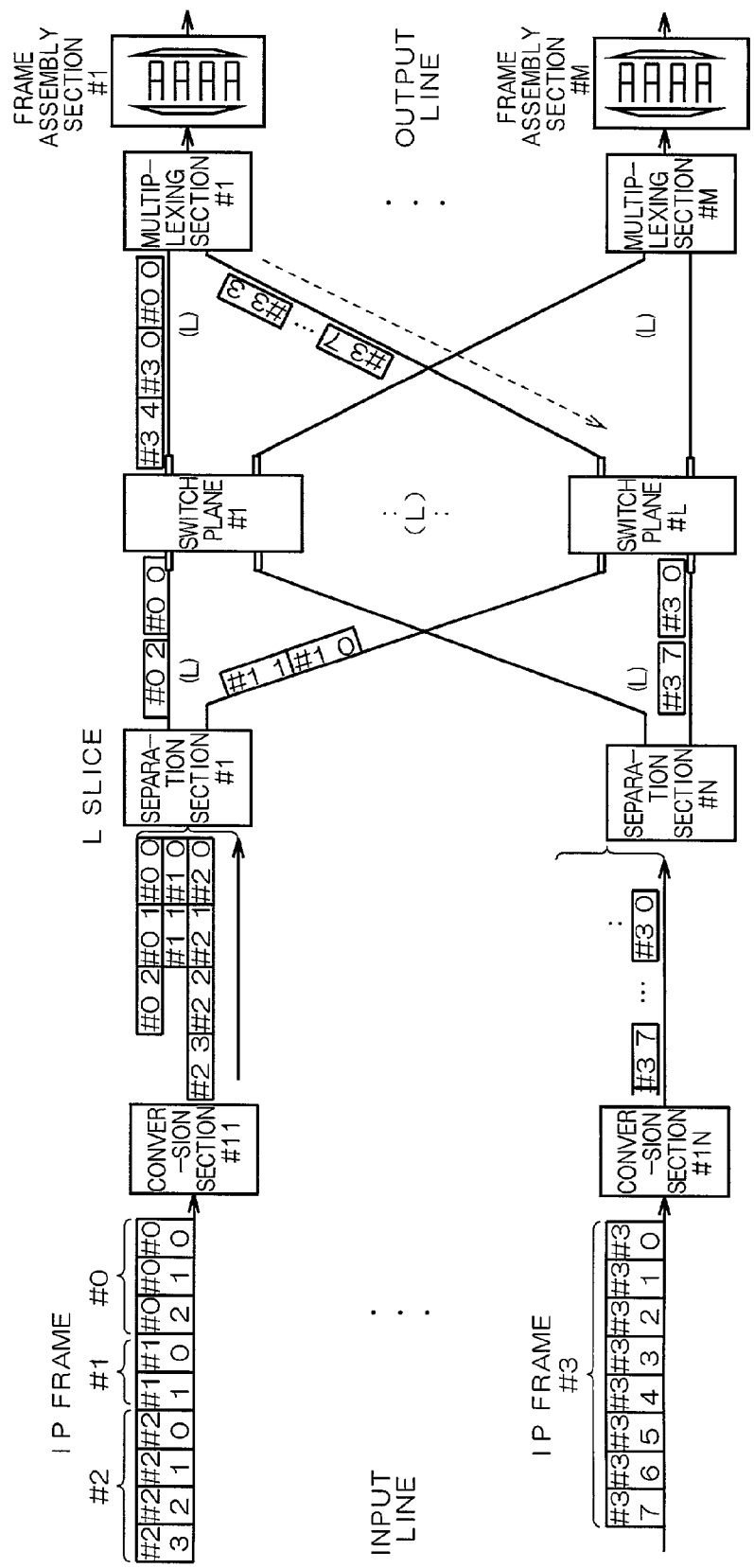
FIG. 23 shows an example of a variation of the packet switch shown in FIG. 19.

FIG. 23 shows an example of a variation of the packet switch shown in FIG. 19. It is different from the configuration shown in FIG. 19 in the method of rearranging the packets in the conversion sections #11 through #1N. That is, in the packet switch shown in FIG. 22, each of the conversion sections #11 through #1N rearranges the packets such that a plurality of packets contained in the same frame can be transmitted to the same switch plane. Thus, when packets are transferred through L switch planes #1 through #L, the packets can be prevented from being disordered in the frame.

Figure 24:
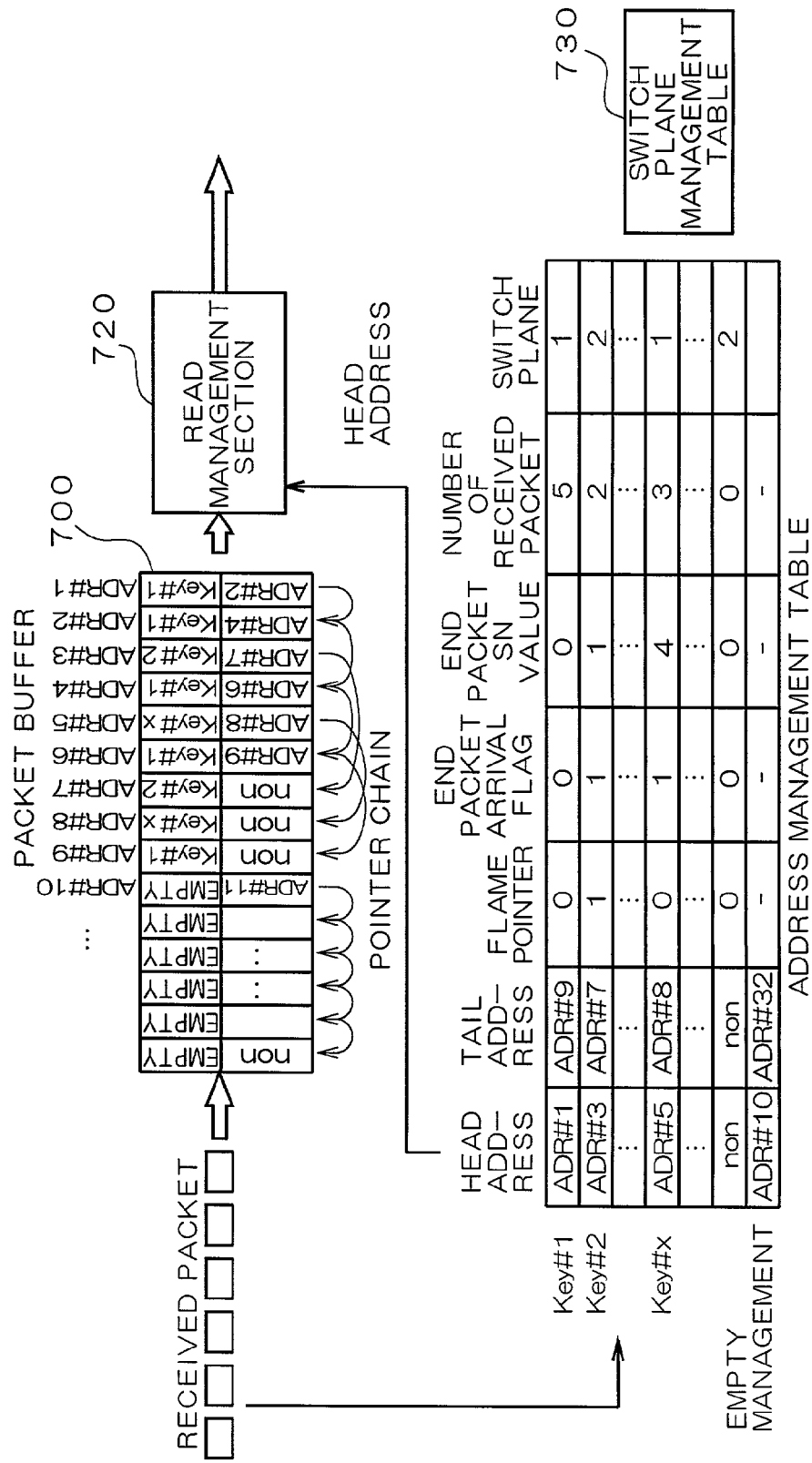
FIG. 24 shows an internal configuration of each frame assembly section shown in FIG. 23.

FIG. 24 shows an internal configuration of the frame assembly section shown in FIG. 23. The contents shown in FIG. 24 are different from those shown in FIG. 20 in that the intra-frame address management information contained in the address management table has been deleted, and a switch plane management table 730 has been added. The switch plane management table 730 is used to manage the number of frames input into the frame assembly section from each input line through each switch plane. A set of a multicast type M, an input line number, a corresponding switch plane number, and the number of frames input into the switch plane is stored in the table.

Figure 25:
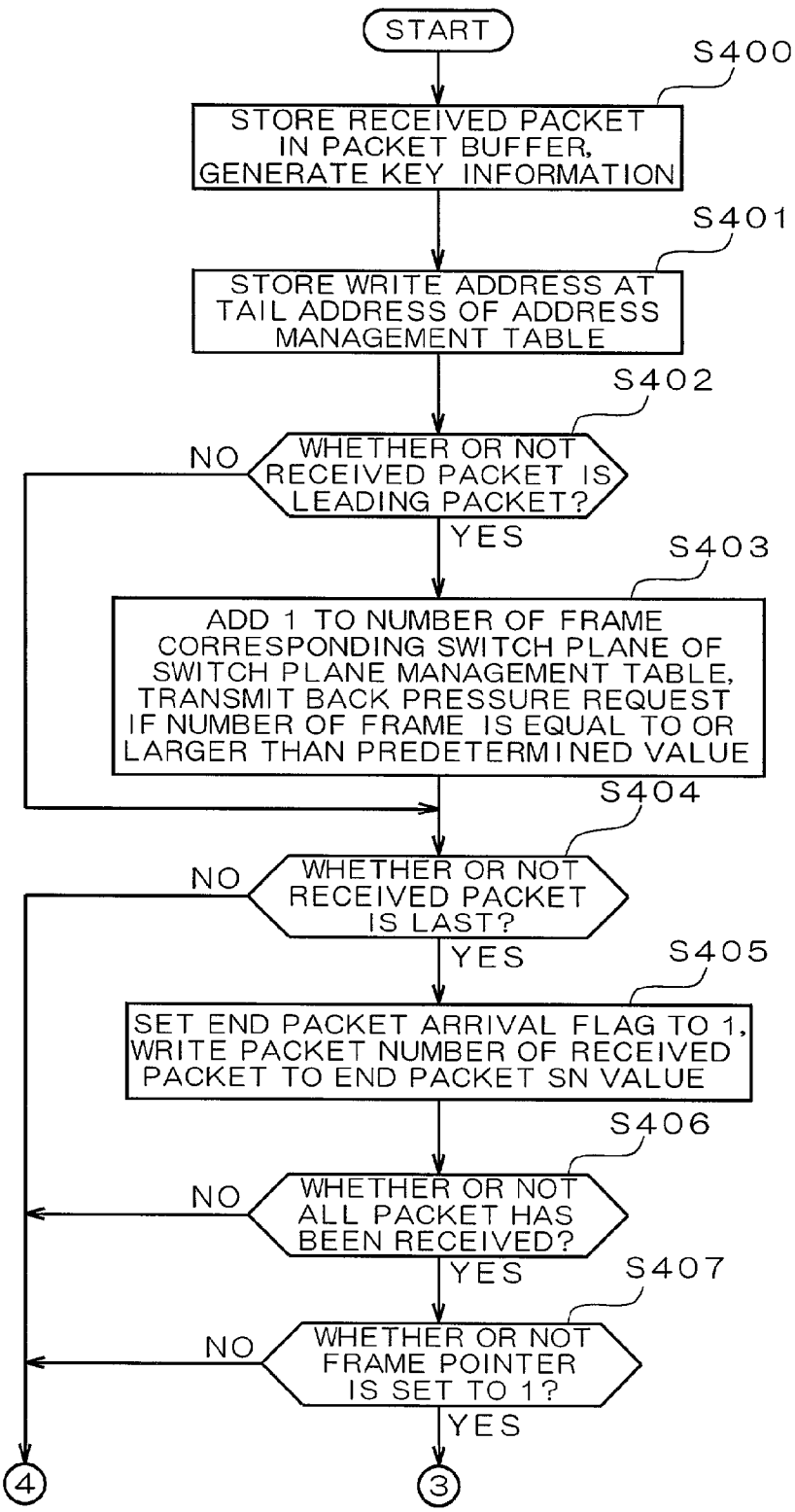
FIG. 25 shows a procedure of an operation of the frame assembly section whose practical example is shown in FIG. 24.
Figure 26:
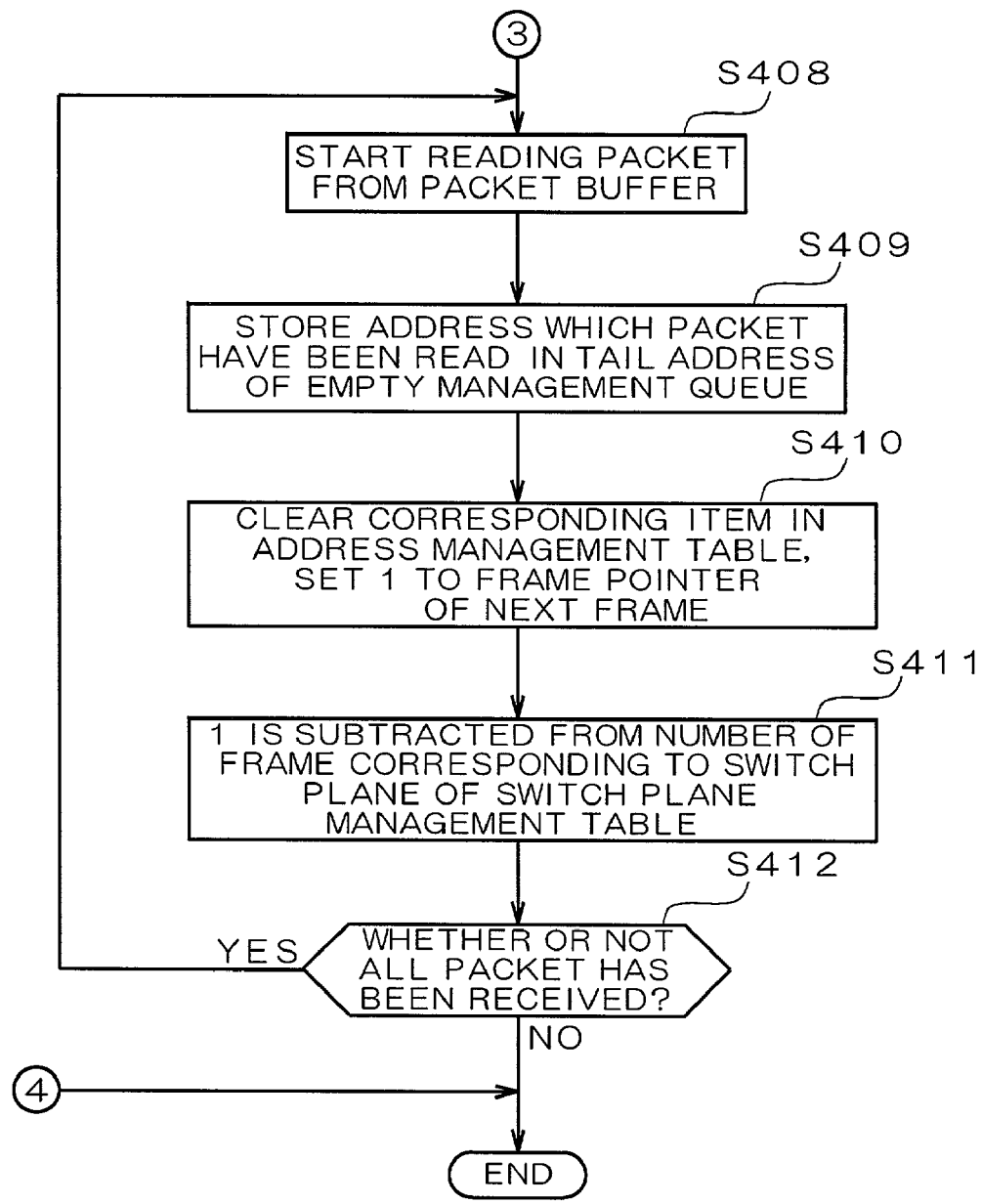
FIG. 26 shows the procedure of the operation of the frame assembly section whose practical example is shown in FIG. 24.

FIGS. 25 and 26 show a procedure of an operation of the frame assembly section whose practical example is shown in FIG. 24.

The frame assembly section stores a received packet at the head of an empty area of the packet buffer 700, and generates the key information about the address management table according to the header information about the received packet (step S400). The frame assembly section stores the write address of the received packet at the tail address corresponding the key information (step S401). If the received packet is the leading packet, the write address is stored also at the head address.

Then, the frame assembly section determines whether or not the received packet is the leading packet (step S402). If it is the leading packet, then affirmative determination is made, and the frame assembly section writes the switch plane information about the received packet on the address management table, adds 1 to the number of frames of the corresponding switch plane of the switch plane management table 730, and transmits a back pressure request to the corresponding switch plane if the number of frames is equal to or larger than a predetermined value (=maximum number of frames/number of slices) (step S403).

If the received packet is not the leading packet, then negative determination is made in step S402, and the frame assembly section determines whether or not the received packet is the end packet (step S404). If it is the end packet, affirmative determination is made, and the frame assembly section sets an end packet arrival flag corresponding to the key information, and sets the packet number of the received packet to the end packet SN value corresponding to the key information (step S405).

Then, the frame assembly section checks whether or not the value obtained by adding 1 to the end packet SN value matches the number of received packets, and then determines whether or not all packets in one frame have been received (step S406). If all packets have not been received yet, negative determination is made, and the frame assembly section enters a wait state.

If all packets have been received, then affirmative determination is made in step S406, and the frame assembly section determines whether or not the frame pointer indicates 1 (step S407). If not, negative determination is made, and the frame assembly section enters a wait state.

If the frame pointer indicates 1, affirmative determination is made in step S407, and the frame assembly section transfers the head address corresponding to the key information to the read management section 720. The read management section 720 sequentially traces the addresses from the head address, and starts reading the packets from the packet buffer 700 while decrementing the number of received packets (S408). At this time, the read management section 720 stores the address of the packet buffer 700 at which all packets have been read as the tail address of the empty management queue in the address management table (step S409). In addition, the read management section 720 reads packets of one frame, then clears the contents of the corresponding items (the end packet arrival flag, the end packet SN value, and the frame pointer, switch plane) in the address management table, retrieves the next frame information (for example, by obtaining it using the maximum value of the (key number+1)% frame number), and sets the frame pointer corresponding to the key information to "1" (step S410).

Next, with respect to the frame in which a series of packets have been read, the frame assembly section decrements a frame number corresponding to the switch plane management table by one. In the case when any back pressure request is transmitted, the frame assembly section releases the back pressure request (step S411).

Then, the frame assembly section checks whether or not the value obtained by adding 1 to the end packet SN value corresponding to the key information matches the number of received packets, thereby determining whether or not all packets in the next frame have been received (step S412). If all packets have not been received, then negative determination is made, and the frame assembly section enters a wait state. If all packets have been received, then the packet reading process and the subsequent processes are repeated in step S408.

Thus, the upper limit (predetermined value) is set for the number of frames to be processed on each switch plane in the frame assembly section, and a back pressure request is transmitted to the switch plane when the number of frames exceeding the upper limit are input. Therefore, the operation of managing the number of frames can be reduced. Furthermore, for the frames of the number smaller than the predetermined value, packets are continuously transferred, thereby preventing the throughput from lowering.

Figure 27:
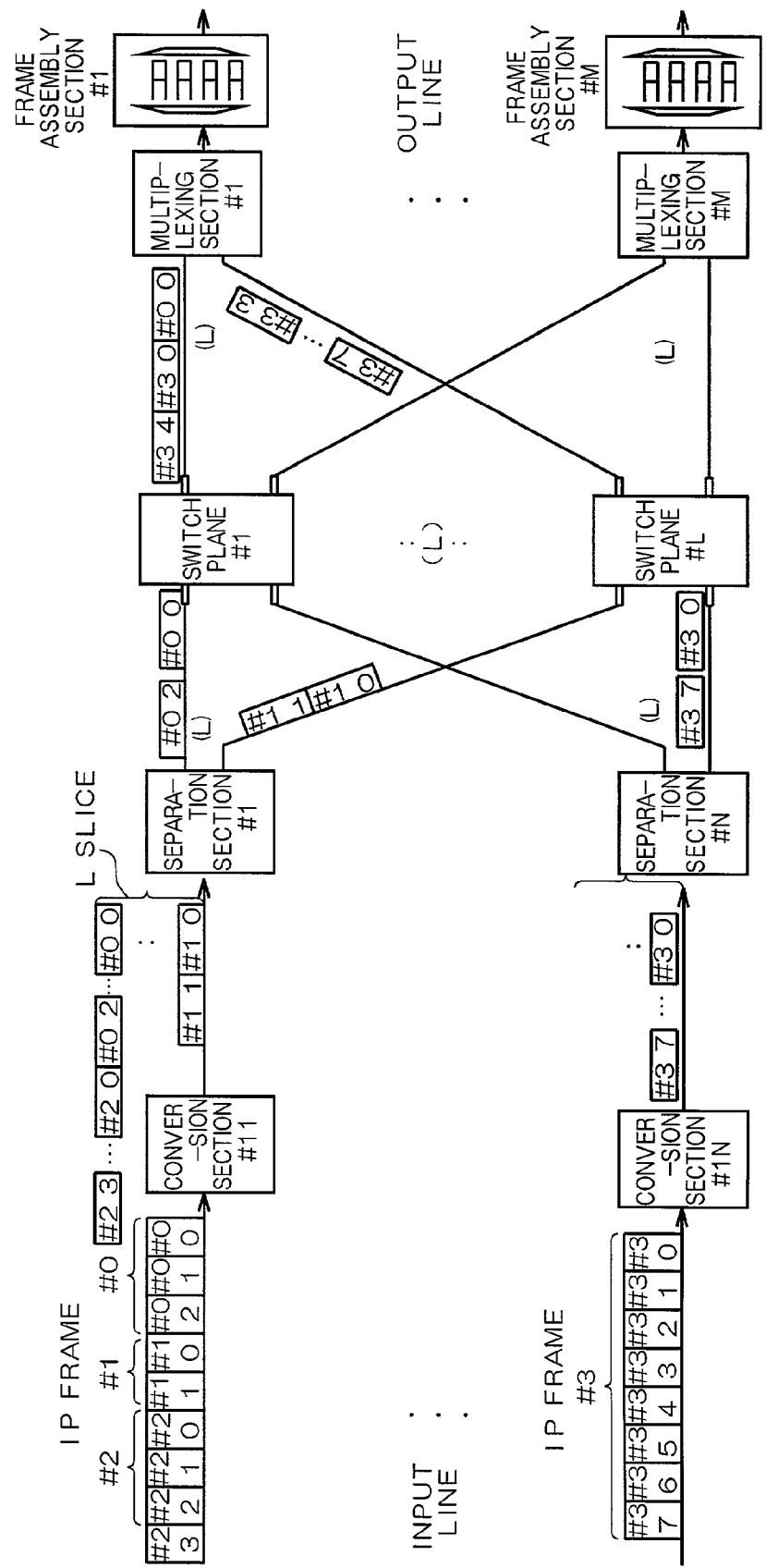
FIG. 27 shows an example of a variation of the packet switch.
Figure 28:
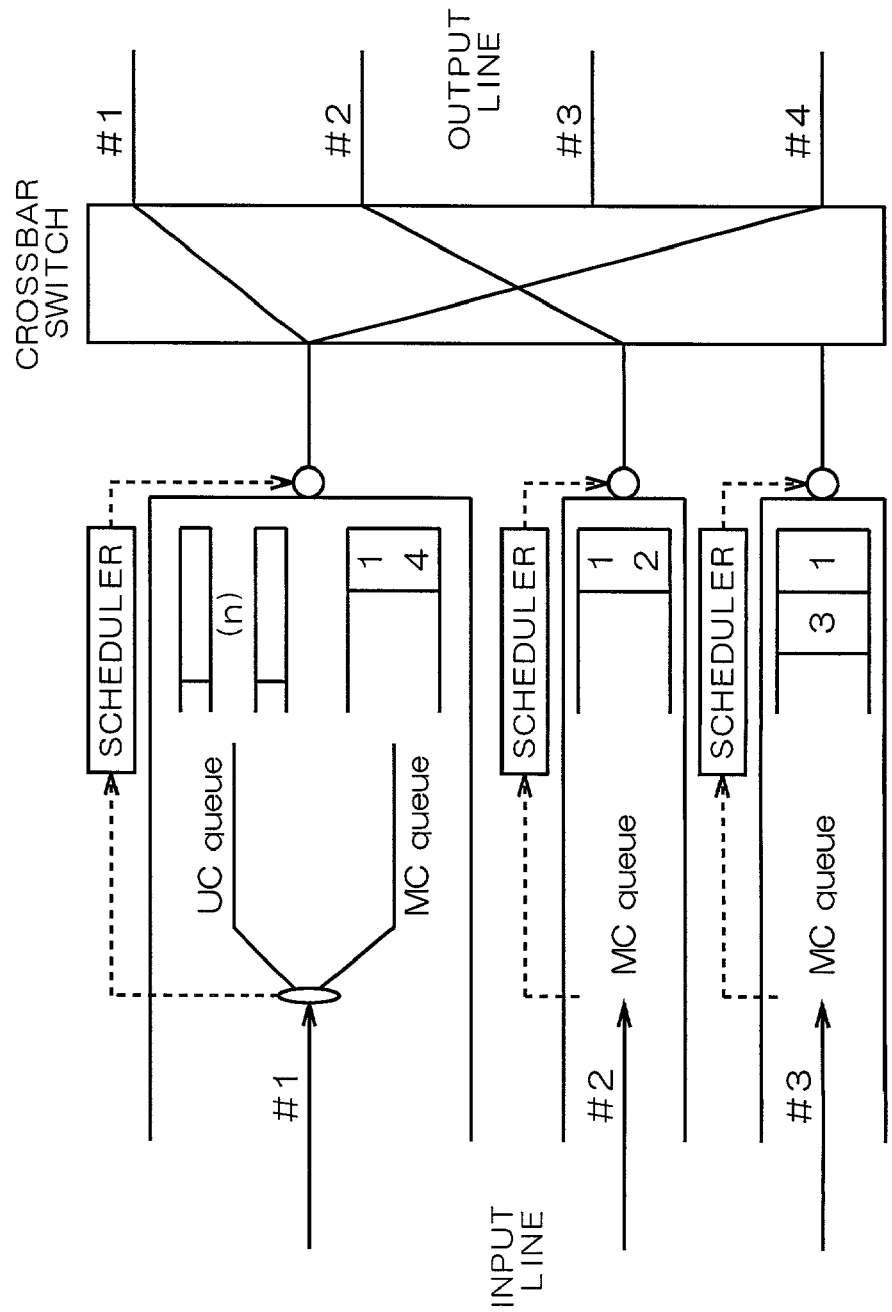
FIG. 28 shows a configuration of a conventional packet switch using an input buffer section.
Figure 29:
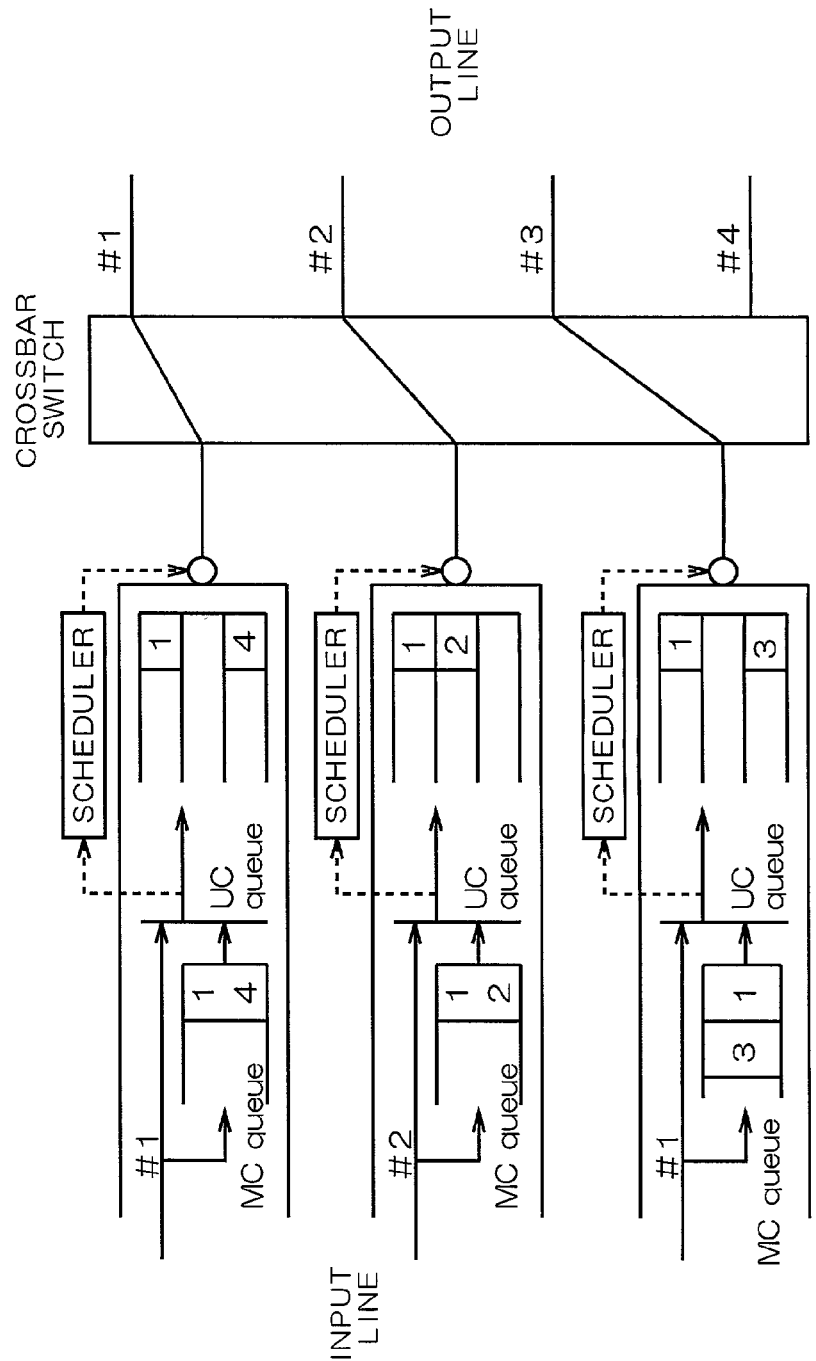
FIG. 29 shows the configuration of the conventional packet switch using an input buffer section.

FIG. 27 shows an example of a variation of a packet switch. In the packet switch shown in FIG. 27, a plurality of packets forming the same variable length frame can be transferred using the same switch plane by identifying a flow for the same variable length frames. The flow identification is performed in each of the conversion sections #11 through #1N. The flow identification can be performed using as flow identifiers the value of the type of service field, a protocol number, a source address, a destination address, etc. contained in the format shown in FIG. 2. In the case of a TCP (Transmission Control Protocol) frame and an UDP (User Datagram Protocol) frame, the flow identification can also be performed using a source port address and a destination port address. Using the information as a key, a fixedly assigned switch plane number predetermined in advance can be retrieved, or the key can be processed in an arithmetic operation using a hash function so that packets can be allotted on the same switch plane for each flow, thereby preventing the packet reception order from being disordered at a stage after the switch plane. Since the frame assembly sections #1 through #M sequentially receives packets from the head of the frame, a buffer to rearrange packets in is not required.

The present invention is not limited to the above mentioned embodiments, but various embodiments can be realized in the scope of the gist of the present invention. For example, according to the above mentioned embodiments, unicast packets and multicast packets coexist, but the multicast packets includes broadcast packets to be output to all output lines.

The invention claimed is:

1. A packet switch, comprising:
   N input buffer sections, provided for respective N input lines, for storing unicast packets and multicast packers input through corresponding input lines;
   a switch section for outputting a unicast packet to any of M output lines to which the unicast packet is transmitted when the unicast packet is input from each of the N input buffer sections, and outputting the multicast packet to a plurality of M output lines to which the multicast packet is to be transmitted when the multicast packet is input; and
   a scheduler section for selecting the unicast packet or the multicast packet to be output from each of said N input buffers such that the input lines and the output lines cannot conflict each other for the unicast packet, and such that the input lines cannot conflict each other for the multicast packet, wherein
   the scheduler section excludes a plurality of destination output lines of the multicast packets from a target of conflict control in a scheduling process for the multicast packets performed by the scheduler section.

2. The packet switch according to claim 1,
   wherein said switch section comprises:
   a first storage section for storing the unicast packet corresponding to each of the M output lines; and
   a second storage section for storing the multicast packet corresponding to each of the N input lines.

3. The packet switch according to claim 2,
wherein priority control is performed by dividing for each quality of service said input buffer sections and at least one of the first storage section and the second storage section of said switch section.

4. The packet switch according to claim 2,
wherein said unicast packet or said multicast packet can be stopped to enter said switch section from said input buffer section by issuing a congestion notification from the switch section to at least one of the input buffer section and the scheduler section when said first storage section or second storage section enters a congestion state.

5. The packet switch according to claim 1,
wherein said scheduler section can reserve a timing at which a packet other than the multicast packet cannot be transmitted through a plurality of destination output lines of the multicast packets, when the multicast packet is inputted from said input buffer section to said switch section.

6. The packet switch according to claim 1, wherein:
a plurality of switch sections are provided;
one of said switch sections receives a part of a divided unicast packet or multicast packet input through the input line and divided into plural sections; and
said plurality of switch sections concurrently transfer plural pieces of divided data corresponding a packet.

7. The packet switch according to claim 1, wherein:
a plurality of switch sections are provided,
one of said switch sections receives a unicast packet or a multicast packet input through the input line in plural unit times; and
said plurality of switch sections concurrently transfer different packets.

8. The packet switch according to claim 7, wherein:
a plural packets forms a frame;
each of the plural packets is assigned a first sequence number for identification of an order of the frame, and a second sequence number for identification of an order of the packet in the frame; and
said packet switch further comprises a frame assembly section for rearranging the packets in the frame based on the second sequence numbers, and rearranging the frames based on the first sequence numbers in the output lines.

9. The packet switch according to claim 7, wherein:
a plural packets forms a frame;
each of the plural packets is assigned a first sequence number for identification of an order of the frame, and a second sequence number for identification of an order of the packet in the frame; and
a corresponding switch section is instructed to stop transferring operations of packets when a number of frames being rearranged reaches a predetermined value when the packets are rearranged based on the first and second sequence numbers in the output lines.

10. The packet switch according to claim 7, wherein:
an IP packet having a variable length is formed by said plurality of packets; and
a packet belonging to the same flow is input to the same switch section based on a flow identification of the IP packet in the input lines.

* * * * *